(12) United States Patent
Huang et al.

(10) Patent No.: US 10,847,785 B2
(45) Date of Patent: Nov. 24, 2020

(54) GROUP IV-VI COMPOUND GRAPHENE ANODE WITH CATALYST

(71) Applicants: Airbus Singapore Private Limited, Singapore (SG); Singapore University of Technology and Design, Singapore (SG)

(72) Inventors: Zhi-Xiang Huang, Singapore (SG); Hui-Ying Yang, Singapore (SG); Ye Wang, Singapore (SG)

(73) Assignees: Airbus Singapore Private Limited, Singapore (SG); Singapore University of Technology and Design, Singapore (SG)

( * ) Notice: Subject to any disclaimer, the term of this patent is extended or adjusted under 35 U.S.C. 154(b) by 160 days.

(21) Appl. No.: 16/066,420

(22) PCT Filed: Dec. 28, 2016

(86) PCT No.: PCT/IB2016/058029
§ 371 (c)(1),
(2) Date: Jun. 27, 2018

(87) PCT Pub. No.: WO2017/118899
PCT Pub. Date: Jul. 13, 2017

(65) Prior Publication Data
US 2019/0020017 A1    Jan. 17, 2019

(30) Foreign Application Priority Data
Jan. 4, 2016 (WO) .................. PCT/IB2016/050012

(51) Int. Cl.
H01M 4/1393    (2010.01)
H01M 4/136    (2010.01)
(Continued)

(52) U.S. Cl.
CPC ......... *H01M 4/1393* (2013.01); *C01B 32/182* (2017.08); *C01G 19/00* (2013.01);
(Continued)

(58) Field of Classification Search
CPC .. H01M 4/1393; H01M 4/0428; H01M 4/131; H01M 4/136; H01M 4/1391;
(Continued)

(56) References Cited

U.S. PATENT DOCUMENTS 7,060,390 B2    6/2006  Chen et al.
8,920,970 B2    12/2014 Sunkara et al.
(Continued)

FOREIGN PATENT DOCUMENTS

CN    103 326 007 B    12/2015

OTHER PUBLICATIONS

Li et al., (2012) "Tin Oxide with Controlled Morphology and Crystallinity by Atomic Layer Deposition onto Graphene Nanosheets for Enhanced Lithium Storage," Advanced Functional Materials, Apr. 24, 2012, 22(8), pp. 1647-1654.
(Continued)

*Primary Examiner* — Jimmy Vo
(74) *Attorney, Agent, or Firm* — Jenkins, Wilson, Taylor & Hunt, P.A.

(57) ABSTRACT

An electrode for use in a lithium-ion battery. The electrode comprises a group IV-VI compound and a transition metal group VI compound on a three-dimensional graphene network. A major portion of the transition metal group VI compound is provided on top of the group IV-VI compound or in close proximity to it, whereby the molybdenum group VI compound contributes to the decomposition of a lithium group VI compound at the surface of the group IV-VI compound.

15 Claims, 17 Drawing Sheets

(51) Int. Cl.
| | |
|---|---|
| H01M 10/0525 | (2010.01) |
| C01G 39/06 | (2006.01) |
| C01B 32/182 | (2017.01) |
| H01M 4/1391 | (2010.01) |
| H01M 4/58 | (2010.01) |
| H01M 4/48 | (2010.01) |
| C01G 19/00 | (2006.01) |
| H01M 4/131 | (2010.01) |
| H01M 4/62 | (2006.01) |
| H01M 4/66 | (2006.01) |
| H01M 4/04 | (2006.01) |
| H01M 4/1397 | (2010.01) |
| H01M 2/02 | (2006.01) |
| H01M 4/02 | (2006.01) |

(52) U.S. Cl.
CPC .......... *C01G 39/06* (2013.01); *H01M 4/0428* (2013.01); *H01M 4/131* (2013.01); *H01M 4/136* (2013.01); *H01M 4/1391* (2013.01); *H01M 4/1397* (2013.01); *H01M 4/483* (2013.01); *H01M 4/581* (2013.01); *H01M 4/62* (2013.01); *H01M 4/663* (2013.01); *H01M 10/0525* (2013.01); *C01P 2002/72* (2013.01); *C01P 2002/82* (2013.01); *C01P 2002/85* (2013.01); *C01P 2002/88* (2013.01); *C01P 2004/03* (2013.01); *C01P 2004/04* (2013.01); *C01P 2006/40* (2013.01); *H01M 2/0222* (2013.01); *H01M 4/0471* (2013.01); *H01M 4/5815* (2013.01); *H01M 2004/027* (2013.01)

(58) Field of Classification Search
CPC .... H01M 4/1397; H01M 4/483; H01M 4/581; H01M 4/62; H01M 4/663; C01B 32/182; C01G 39/06
See application file for complete search history.

(56) References Cited

U.S. PATENT DOCUMENTS

| | | | |
|---|---|---|---|
| 9,120,677 | B2 | 9/2015 | Watson et al. |
| 2009/0117467 | A1 | 5/2009 | Zhamu |
| 2013/0089796 | A1 | 4/2013 | Sun et al. |
| 2015/0155562 | A1 | 6/2015 | Ha et al. |

OTHER PUBLICATIONS

Sathish et al., (2012) "Nanocrystalline tin compounds/graphene nanocomposite electrodes as anode for lithium-ion battery," Journal of Solid State Electrochemistry, Feb. 22, 2012, 16(5), pp. 1767-1774.

Shen et al., (2011) "Synthesis and electrochemical properties of graphene-SnS2 nanocomposites for lithium-ion batteries," Journal of Solid State Electrochemistry, Dec. 8, 2011, 16(5), pp. 1999-2004.
Yang et al., (2015) "Free-standing molybdenum disulfide/graphene composite paper as a binder- and carbon-free anode for lithium-ion batteries," Journal of Power Sources, Apr. 22, 2015, 288, pp. 76-81.
European Search Report for Application No. 16883504 dated Sep. 23, 2019.
Huang et al. (2014) "3D graphene supported MoO2 for high performance binder-free lithium ion battery", Nanoscale, 2014, 6(16), pp. 9839-9845.
Hwang, et al., (2015). "Mesoporous Ge/GeO2/Carbon lithium-ion battery anodes with high capacity and high reversibility", ACS nano, 9(5), pp. 5299-5309.
Jiang, et al., (2013) "In situ assembly of graphene sheets-supported SnS2 nanoplates into 3D macroporous aerogels for high-performance lithium ion batteries", Journal of Power Sources, 2013, 237, pp. 178-186.
Qu, et al., (2015) "Origin of the Increased Li+-Storage Capacity of Stacked SnS2/Graphene Nanocomposite", ChemElectroChem, 2015, 2(8), pp. 1138-1143.
Seng, et al., (2013) "Catalytic role of Ge in highly reversible GeO2/Ge/C nanocomposite anode material for lithium batteries", Nano letters, 13(3), pp. 1230-1236.
Wang, et al., (2014) "Pre-lithiation of onion-like carbon/MoS2 nano-urchin anodes for high-performance rechargeable lithium ion batteries", Nanoscale, 2014, 6(15), pp. 8884-8890.
Wang, et al., (2015) "Designed hybrid nanostructure with catalytic effect: beyond the theoretical capacity of SnO2 anode material for lithium ion batteries", Scientific Reports, 2015, 5(9164), pp. 1-8.
Zhang, et al., (2012) "Graphene oxide oxidizes stannous ions to synthesize tin sulfide-graphene nanocomposites with small crystal size for high performance lithium ion batteries", Journal of Materials Chemistry, 2012, 22(43), pp. 23091-23097.
Zhang, et al., (2013) "Graphene/acid coassisted synthesis of ultrathin MoS2 nanosheets with outstanding rate capability for a lithium battery anode", 2013 American Chemical Society, Inorganic Chemistry, 2013, 52(17), pp. 9807-9812.
Zhu, et al., (2014), "Catalyst engineering for lithium ion batteries: the catalytic role of Ge in enhancing the electrochemical performance of SnO2 (GeO2) 0.13/G anodes", Nanoscale, 6(24), pp. 15020-15028.
Zou, et al., (2015) "Three-dimensional-networked NiCo2S4 nanosheet array/carbon cloth anodes for high-performance lithium-ion batteries", NPG Asia Materials, 2015, 7(e195), pp. 1-8.
International Preliminary Report on Patentability, Written Opinion, and International Search Report for Application No. PCT/IB2016/058029 dated Jul. 10, 2018.

GROUP IV-VI COMPOUND GRAPHENE ANODE WITH CATALYST

CROSS-REFERENCE TO RELATED APPLICATIONS

This application is a 371 continuation of PCT Patent Application No. PCT/IB2016/058029 filed Dec. 28, 2016, which claims priority to PCT/IB2016/050012 filed Jan. 4, 2016, the disclosures of each of which are incorporated herein by reference in their entirety.

TECHNICAL FIELD

The present application relates to a lithium-ion battery anode with enhanced performance. The battery anode contains a group IV-VI compound, in particular, tin disulfide, as the main active component and a transition metal group VI compound as catalyst. In particular, the catalyst can be provided as molybdenum group VI compound or as tungsten group VI compound, such as molybdenum disulfide or tungsten disulfide.

BACKGROUND

Present generation lithium-ion batteries (LIB) utilize graphitic anodes which are low cost and provide a stable platform for Li-ion storage over low-high current densities over long charge-discharge cycles. However, graphite anodes are limited to a low Li-storage capacity of 372 mAh/g due to the simple insertion/de-insertion process where Li-ions are stored on and removed from the interstitial spaces of graphite. On the other hand, advanced anodes adopting different Li-ion storage chemistries are able to improve storage capacities by up to 10 times or more have been proposed and researched.

The references (1) to (14), which are listed at the end of the present specification, illustrate the technical development with respect to lithium-ion battery anodes. They are referred to as "reference (1)", "reference (2)" etc.

In anodes for lithium-based batteries a catalysts have been used for several applications. Firstly, catalysts have been applied to facilitate the synthesis of nanomaterials such as carbon nanotubes, graphene, metals and metal oxide compounds. However, the usage of the catalysts in these applications is limited to the synthesis of the final product and the catalysts do not take part or improve the performance of the active materials when used as an anode for a lithium-ion battery.

Secondly, catalysts have also been applied in the use of lithium-ion batteries where the reversible doping and de-doping of lithium is catalyzed by oxides of transition elements such as cobalt oxide ($Co_3O_4$), manganese oxide ($MnO_2$), iron oxide ($Fe_2O_3$ or $Fe_3O_4$), nickel oxide (NiO), copper oxide (CuO) and precious metals such as gold (Au) and Platinum (Pt). However, this battery system is inherently different from lithium-ion based batteries as the former requires external oxygen supply whereas the latter is a closed system.

Lastly, there have been several reports in literature which propose the use of semi-metals and transitions metals and their oxides as catalysts to facilitate the reversible reaction of equation (3) in $MX_2$ type alloy-type anodes. Both Cho et al. according to reference (5) and Lee et al. according to reference (6) synthesized composites of Ge dopant. In tin oxide ($SnO_2$), Yang et al. according to reference (7) doped both $GeO_2$ and $Co_3O_4$ to form composites with reduced graphene oxides (rGO).

In the references (5), (6) and (7), the authors have shown the effectiveness of the catalyst in enhancing the lithium storage capacities of the alloy-type metal oxide anodes. However, this method of catalyst mediated enhancement of lithium storage capabilities have yet to be attempted or reported in the metal sulfide, specifically $SnS_2$.

Both Cho et al. according to reference (5) and Lee et al. according to reference (6) synthesized composites of Germanium (Ge) doped Germanium Oxide ($GeO_2$) composited with carbon and showed the catalytic effect of Ge dopant. In the references (5) and (6), the authors have shown the effectiveness of the catalyst in enhancing the lithium storage capacities of the alloy-type metal oxide anodes. However, this method of catalyst mediated enhancement of lithium storage capabilities have yet to be attempted or reported in the metal sulfide, specifically $SnS_2$.

SUMMARY

In the following, the reactions in a known lithium-ion battery are explained first for better understanding of lithium-ion battery according to the present specification.

In a first step, transition metal oxides/sulfides store lithium through a conversion reaction in which the transition metal oxide/sulfides are broken down to from lithium oxide/sulfide and pure metal. In the reverse process (discharge), lithium oxide/sulfide breaks down in the presence of the transition metal and lithium is released back to the cathode. In another process, anodes based on metals and semimetals such as Si, Sn, Ge, Pb store lithium through an alloying/de-alloying process. In this process, the active elements alloy with lithium and yield high capacities, e.g. $Li_{4.4}Si$ with theoretical capacities of 3590 mAh/g.

During a charging process of a lithium-ion battery, electrons are transferred from the positive electrode to the negative electrode. The negative electrode, which is the cathode with respect to the charging reaction, takes up positively charged lithium ions and reduces them to lithium atoms, thereby compensating the negative charge of the electrons. Conventionally, the anode and cathode of a battery are defined with respect to the discharging reaction. According to this convention the negative electrode is referred to as the anode in the present specification.

The uptake of lithium-ions during a first charging of a lithium-ion battery at an $MX_2$ containing anode is described by an insertion reaction

$$MX_2 + xLi^+ + xe^- \rightarrow Li_xMX_2 \quad (1)$$

which is followed by a conversion reaction:

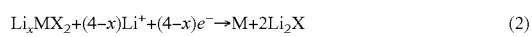

$$Li_xMX_2 + (4-x)Li^+ + (4-x)e^- \rightarrow M + 2Li_2X \quad (2)$$

By inserting the left hand side of equation (1) into equation (2) this can be summarized by an overall reaction

$$MX_2 + 4Li^+ + 4e^- \rightarrow M + 2Li_2X \quad (3),$$

wherein "M" stands for the group IV metals Sn, Ge or Si and "X" stands for the group VI elements O, S or Se, and x is the number of mols of lithium reacting with M in the different reactions.

During the later charge-discharge cycles the reaction at the anode can be summarized by

$$M + 4.4Li^+ + 4.4e^- \leftrightarrow Li_{4.4}M \quad (4)$$

where the left-to-right arrow relates to charging and the right-to-left arrow to discharging.

In these reactions, the $Li_2X$ generated in equation (2) is irreversible. This stands in contrast to conversion-type anodes which provide a suitable catalyst to facilitate the breakdown of $Li_2X$. The irreversibility results in a loss of lithium and to a reduced initial coulombic efficiency.

In general, sulfide based alloy/dealloying anodes, such as $SnS_2$ anodes, undergo initial reactions to release pure metal, such as Sn, for subsequent alloying/dealloying reactions. In these reactions, $Li_2S$ generated is irreversible due to the lack of a suitable catalyst to facilitate the breakdown of $Li_2S$. This results in a loss of lithium and poor initial coulombic efficiency.

According to an embodiment of the current specification, tin disulfide ($SnS_2$) is used as the main active component for Lithium storage in an anode and a small amount of Molybdenum Disulfide ($MoS_2$) is used as a catalyst source which allows the reaction to be reversible. The introduction of $MoS_2$ as a catalyst source does not only improve the initial coulombic efficiency but also reduce the wastage of lithium which is conventionally "trapped" in $SnS_2$ anodes. This implies that $SnS_2$ is able to react with 8.4 mols of Lithium instead of 4.4, and thereby increasing its theoretical capacities from 645 mAh/g to 1232 mAh/g.

In a lithium-ion battery according to an embodiment of the present specification, tin disulfide ($SnS_2$) is used as the main active component for lithium storage and, furthermore a small amount of Molybdenum Disulfide ($MoS_2$) as a catalyst source which allows to reverse the reaction of equation (3). The introduction of $MoS_2$ as a catalyst source can not only improve the initial coulombic efficiency but also it can also reduce the wastage of lithium which is conventionally "trapped" in $SnS_2$ is able to react with 8.4 mols of lithium instead of 4.4 and thereby increasing its theoretical capacities from 645 mAh/g to 1232 mAh/g.

In an anode according to the present specification, a small amount (5%) of a transition metal sulfide ($MoS_2$) is introduced as a dopant which acts as a catalyst to facilitate the release of "trapped" LbS generated during an initial conversion reaction. The $MoS_2$ is grown onto the active component ($SnS_2$) via a solvothermal process and annealing. In this process, fine nanosheets of $MoS_2$ are grown directly on larger vertically aligned $SnS_2$ nanosheets which are anchored on 3-dimensional graphene foam (3DG). The close proximity of $MoS_2$ to $SnS_2$ promotes the catalytic action of breaking down $Li_2S$ as it forms around $SnS_2$ during charge-discharge cycles.

In a lithium-ion battery according to the present specification, the lithium storage capabilities of $SnS_2$ alloy type anode materials are improved by introducing a small amount of $MoS_2$ dopant (5%), which acts as a catalyst to facilitate the release of "trapped" $Li_2S$ generated during an initial conversion reaction. Apart from the dopant of the catalyst, the several factors also play a role in the enhanced performance. Firstly, the as-synthesized composite material utilizes a 3-dimensional graphene (3DG) as a backbone, which replaces conventional copper current collectors. In this manner, the 3DG not only contributes to stored lithium, it also reduces the overall weight of the anode significantly. By comparison, a copper foil has a density of ≈6 $mg/cm^2$, whereas the 3DG has a density of ≈0.3 $mg/cm^2$. This in turn increases the overall energy density of the anode material compared to a conventional copper foil current collector based anodes. Further, the composite material utilizes easily scalable methods of chemical vapor deposition (CVD) to obtain 3DG and hydrothermal synthesis to obtain hierarchical nanostructures of 2D nanosheets on 3D graphene.

These syntheses allow the formation of fine nanosheets of $MoS_2$ on larger vertically aligned $SnS_2$ nanosheets, which are anchored on 3DG. The close proximity of $MoS_2$ to $SnS_2$ promotes the catalytic action of breaking down $Li_2S$ as it forms around $SnS_2$ during charge-discharge cycles. At the base of $SnS_2$, 3DG forms an intricate network that facilitates the rapid flow of electrons. The 3DG also possesses an array of pores which enables the ease of electrolyte wetting and thus allows smooth transition of lithium-ions between electrodes.

Among others, a hierarchical morphology of a $SnS_2$/$MoS_2$/3DG composite in an anode according to the present specification can provide the following advantages:
(1) The 3DG material forms an interconnected porous network allowing rapid lithium uptake and high electron mobility.
(2) Furthermore, the 3DG material provides a binder-free, lightweight current collector which allows significant weight savings.
(3) Moreover, the 3DG forms an interconnected porous network that allows rapid lithium uptake and electron mobility
(4) A catalytic effect is achieved by introducing a small amount of $MoS_2$ (5%).
(5) Fine nanosheets of $MoS_2$ grown on $SnS_2$ promote the catalytic breakdown of $Li_2S$. The catalytic effect brought about significant improvement in first cycle coulombic efficiency and overall charge/discharge capacities.

The current specification provides an electrode for use as an anode of a lithium-ion battery. The electrode comprises a group IV-VI compound, which is preferentially tin disulfide, and a transition metal group VI compound, which is preferentially molybdenum disulfide, on a three-dimensional graphene network. The three-dimensional graphene network comprises pores that are sufficiently large to allow efficient wetting with an electrolyte, thereby providing a pathway for lithium ions to travel into and out of the electrode.

Furthermore, a major portion of a transition metal group VI compound is provided on top of the group IV-VI compound or in close proximity to it such that the transition metal group VI compound contributes to the decomposition of a lithium group VI compound which has been formed at the surface of the group IV-VI compound. In other words, the transition metal group VI compound is a catalyst for the decomposition of the lithium group VI compound. Specifically, the transition metal can be a transition metal which is suitable for desulfurization, such as molybdenum or tungsten.

In a specific embodiment, the transition metal group VI compound is molybdenum disulfide, the group IV-VI compound is tin disulfide and the lithium group VI compound is lithium sulfide.

In particular, a distance between the transition metal group VI compound and the group IV-VI compound can be of the order of 10 nanometer or smaller. The major portion of the transition metal group VI compound may comprise 60 or more percent, preferentially 80 or more percent and even more preferentially 90 or more weight percent of the transition metal group VI compound on the electrode material.

In a preferred embodiment, the content of the transition metal group VI compound is between 2% and 8% weight percent and in an even more preferred embodiment the content of the transition metal group VI compound is between 4% and 6%, wherein weight percent refers to the weight of the transition metal group VI compound per weight of the group IV-VI compound on the three dimensional graphene.

The transition metal group VI compound comprises a transition metal and a group VI element, the group VI element being selected from the group consisting of sulphur, selenium and oxygen. In a specific embodiment, the transition metal group VI compound is represented by the chemical formula $TY_2$, wherein T is a transition metal which is suitable as a catalyst for a decomposition of the lithium group VI compound and Y is selected from the group consisting of sulphur, oxygen and selenium. Preferentially, T is selected from the group consisting of tungsten and molybdenum and even more preferentially T is molybdenum.

In particular, X and Y can refer to the same chemical element. In the present specification, Latin numbers such as IV and VI refer to the number of a main group.

The group IV-VI compound is represented by the chemical formula $MX_2$, wherein M is selected from the group consisting of tin, germanium and silicon and X is selected from the group consisting of sulphur, oxygen and selenium.

The lithium group VI compound is selected from the group consisting of lithium sulfide, lithium selenide and lithium oxide. In particular, the lithium sulphur, selenium or oxygen in the lithium group VI compound can be the same element as the element symbolized by the letter X.

According to a specific embodiment, the three dimensional graphene network is obtained by a chemical vapor deposition of ethanol on a metal foam. The metal foam can provide a frame for forming a porous medium with suitable pore sizes and porosity.

In a further embodiment, the transition metal group VI compound, which may be molybdenum disulfide, is provided on a material which comprises the group IV-VI compound, which may be tin disulfide, on a three-dimensional graphene network. In this way, the transition metal group VI compound can be provided on top of the group IV-VI compound.

In particular, the transition metal group VI compound can be provided in the form of nanosheets or other surface structure with a large surface to volume ratio. Furthermore, the transition metal group VI compound nanosheets, which may be molybdenum disulfide nanosheets, or another molybdenum group VI compound surface structure with a high surface to volume ratio, can be grown on top of the group IV-VI compound, which may be tin disulfide.

In particular, the transition metal group VI compound nanosheets can be provided as small nanosheets on larger group IV-VI compound nanosheets. More specifically, the group IV-VI compound nanosheets can be anchored on the three dimensional graphene and the group IV-VI compound nanosheets can provided essentially vertically with respect to a surface of the three dimensional graphene. Thereby, a contact with the reactants, a reaction surface and an effective degradation of the lithium group VI compound, which may be lithium sulfide, can be improved.

Furthermore, the three-dimensional graphene can be provided as a lightweight and binder-free interconnected porous network. In one specific embodiment, a loading of tin disulfide is between 0.7 mg and 1 mg per cubic centimeter of the three dimensional graphene network. For use in a coin cell, the graphene network can be provided as cylindrical slabs. By way of example, the cylindrical slabs can have a diameter of 12 mm, a height of 1.6 mm and a volume of $\pi \times (12/2 \text{ mm})^2 \times 1.6 \text{ mm} \approx 181 \text{ mm}^3$.

In a further aspect, the present specification discloses a lithium-ion battery, such as a coin cell, with the aforementioned electrode, which is used as an anode. The lithium-ion battery comprises a casing with a first terminal and a second terminal, a counter electrode or cathode and an electrolyte which contains lithium ions.

The anode, the cathode and the electrolyte are provided in the casing. Furthermore, a membrane or microporous foil can be provided between the anode and the cathode, such as a polymer foil, a ceramic foil or a ceramic coated fiber mat for avoiding direct contact of the electrode materials.

In the battery, the anode is connected to a first terminal, the cathode is connected to the second terminal, and the electrolyte is in contact with the anode and with the cathode. In particular, the electrolyte can be provided such that the pores of the three-dimensional graphene are covered with the electrolyte.

The lithium-ion battery may also comprise further components such as electronic components and sensors for controlling the charge-discharge process and monitoring the health state of the battery.

According to a further aspect, the current specification provides a method of producing an electrode for a lithium-ion battery. A carbon compound, such as ethanol is deposited by a chemical vapor deposition on a porous metal scaffold to obtain a three dimensional graphene (3DG). A mixture with a group IV-VI compound, in particular with a tin compound, is brought into contact with the 3DG and is subjected to a hydrothermal treatment to obtain a group IV-VI compound surface structure, in particular a tin disulfide surface structure, on the three dimensional graphene. In particular the surface structure can be provided in the form of nanosheets.

Furthermore, a mixture with a transition metal compound, in particular a molybdenum or a tungsten compound, is brought into contact with the 3DG that comprises the group IV-VI surface structure and is subjected to a second hydrothermal treatment to obtain a transition metal group VI compound surface structure, in particular a molybdenum disulfate surface structure on the group IV-VI surface structure. In particular, the surface structure can be provided in the form of nanosheets.

In particular, the preparation of the three dimensional graphene can comprise flowing a mixture of argon and ethanol over a nickel foam, subsequent cooling and etching away the nickel foam. In one embodiment, the argon/ethanol is flowed at about 1000° C. for about 5 minutes, the cooling is performed at a rate of about 100° C./min and the nickel foam is etched away with hydrochloric acid at about 80° C. In particular, the indication "about" with respect to a value can refer to a range comprising the value +/−10% or to a range comprising the value +/−5%.

In a specific embodiment, the preparation of the group IV-VI compound on the three dimensional graphene comprises providing a mixture of a tetrachloride of a group IV element, water, thioacetamide and sodium dodecyl sulfate in ethanol, bringing the mixture into contact with the three dimensional graphene, and letting the mixture and the three dimensional graphene react, wherein the group IV element can be in particular tin, germanium or silicon. In a specific embodiment, the reaction is performed at about 180° C. for about 12 hours.

In a further specific embodiment, the preparation of the transition metal disulfide on the three dimensional graphene comprises providing a mixture of L-cycsteine and a sodium transition metal compound, such as sodium molybdate, in water and ethanol. Furthermore, pieces of the three dimensional graphene are brought into together with the tin disulfide surface structure and the mixture. The three dimensional graphene with the tin disulfide surface and the mixture is then allowed sufficient time to react. In particular, the reaction can be performed at about 400° C. for about 2 hours at a rate of about 3° C./min.

Furthermore, the electrode material can be subjected to drying at above 100° C. and in particular at about 120° C. for about 12 hours.

In a further aspect, the current specification discloses a method for producing a lithium-ion battery, such as a coin cell. The method comprises providing a counter electrode and a membrane, inserting the electrode, the membrane and the counter electrode into a casing of the coin cell, filling an electrolyte into the casing of the lithium-ion battery and closing the casing of the lithium-ion battery.

BRIEF DESCRIPTION OF THE DRAWINGS

The subject matter of the present specification is now explained in further detail with respect to the following Figures in which.

DETAILED DESCRIPTION

Figure 1:
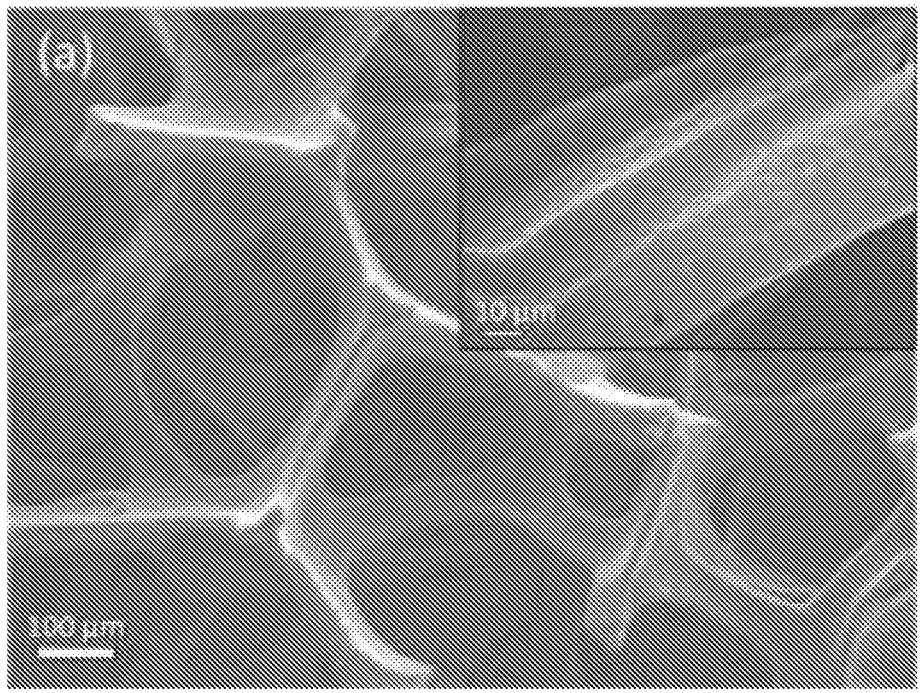
FIG. 1 shows a SEM image of 3-dimensional interconnected porous network of a three dimensional graphene (3DG) and a high magnification inset.

A $SnS_2/MoS_2/3DG$ anode material was prepared in three steps. Molybdenum disulfide ($MoS_2$) doped on tin disulfide ($SnS_2$) with a 3-dimensional graphene foam (3DG) base ($SnS_2/MoS_2/3DG$) was prepared by 3 general steps: (1) chemical vapor deposition (CVD) to obtain 3DG, (2) hydrothermal treatment to obtain $SnS_2$ on 3DG ($SnS_2/3DG$), and (3) hydrothermal treatment to obtain $MoS_2$ on $SnS_2/3DG$ ($SnS_2/MoS_2/3DG$). The 3 steps are explained in further detail below.

Step 1, Preparation of 3DG foam by CVD and removal of Ni foam: Ni foam (1.6 mm thick, purchased from Alantum Advanced Technology Materials (Shenyang)), was cut into 150 mm×45 mm pieces. The rectangular Ni foam pieces were then rolled and placed into a 1 inch quartz tube. Before heat was applied, Argon (Ar) gas was allowed to flow for 10 mins to remove residual air in the tube. Thereafter, a heat rate of 50° C./min was applied to heat the quartz tube to 1000° C. At this temperature, ethanol vapor is mixed with the flowing argon gas through the bubbling of anhydrous ethanol. The mixture Ar/ethanol vapor was allowed to flow for 5 mins. Lastly, the quartz tube was allowed to cool to room temperature rapidly (≈100° C./min). The Ni foam on 3DG-Ni was removed in an etchant solution of 3M HCl at 80° C. Pure 3DG was washed using deionized (DI) water and ethanol several times before drying at 60° C. The typical loading of this process yields 0.25-0.3 mg/cm² of 3DG on Ni foam (3DG-Ni).

Step 2, Synthesis of $SnS_2/3DG$: $SnS_2$ grown on 3DG ($SnS_2/3DG$) was prepared via a simple solvothermal reaction. $SnCl_4$, $5H_2O$ (32 mM), thioacetamide (TAA) (80 mM), and sodium dodecyl sulfate (SDS) (0.07 mM) were weighed and dissolved into 35 mL ethanol. Magnetic stirring and mild heat (50° C.) was applied to ensure homogeneity of the precursors. 6 pieces of 3DG (12 mm diameter) were cut and transferred, together with the mixture, into a 50 mL Teflon-line stainless steel autoclave. The reaction proceeded by heating the autoclave at 180° C. for 12 hours. After the reaction, as-synthesized SnS$_2$/3DG was collected by rinsing with deionized H$_2$O and ethanol, and drying at 60° C. The loading of SnS$_2$ on 3DG was between 0.7-1 mg.

Step 3, Synthesis of SnS$_2$/MoS$_2$/3DG: MoS$_2$ grown on SnS$_2$/3DG (SnS$_2$/MoS$_2$/3DG) was prepared by an L-cysteine assisted solvothermal reaction, L-cysteine (0.25 mM) and Na$_2$MoO$_4$.H$_2$O (0.03 mM) was weighed and dissolved in 15 mL deionized H$_2$O. 15 mL of ethanol was added to the continuously stirred mixture. Six pieces of SnS$_2$/3DG were added to the mixture and the mixture was transferred to a 50 mL Teflon®-lined stainless steel autoclave.

The stainless steel autoclave was heated at 180° C. for 12 h. The as-synthesized SnS$_2$/MoS$_2$/3DG was collected by rinsing with deionized H$_2$O and ethanol, and drying at 60° C. A resulting loading of MoS$_2$ on SnS$_2$/3DG is between 0.05-0.1 mg. Lastly, the SnS$_2$/MoS$_2$/3DG was annealed in a nitrogen (N$_2$) at 400° C. for 2 hours at a slow heating rate of 3° C./min.

A SnS$_2$/MoS$_2$/3DG anode, comparison anodes and a cathode were prepared as follows. The as-synthesized SnS$_2$/MoS$_2$/3DG was used directly as an anode in a two electrode half-cell configuration in which lithium metal acts as the counter electrode or cathode. Control samples of SnS$_2$/3DG, pure SnS$_2$ and SnS$_2$/MoS$_2$ were also assembled. Pure SnS$_2$ was synthesized using the procedure described in step 3 by using pure SnS$_2$ instead of SnS$_2$/3DG.

Electrodes for the powdered control samples, SnS$_2$ and SnS$_2$/MoS$_2$ were made into a slurry and subsequently coated on Ni foam current collectors (12 mm diameter each). The slurry was prepared by mixing 8 parts of active materials to 1 part of polyvinylidene fluoride (PVDF) binder and 1 part of carbon black in the presence of N-methylpyrrolidone (NMP) solvent.

The SnS$_2$/3DG was used directly as an electrode. All working electrodes were dried at 120° C. for 12 hours before assembly. A coin cell was assembled in an Ar-filled glove box using standard CR 2032 as casing. Each cell consisted of a Celgard 2400 membrane sandwiched between a working electrode, which contained the active material, and counter electrode, which contained lithium material. The electrolyte used was a mixture of 1M LiPF$_6$ solution in ethylene carbonate (EC)/Di-methyl carbonate (DMC), with a volume ratio v/v of 1:1.

Figure 2:
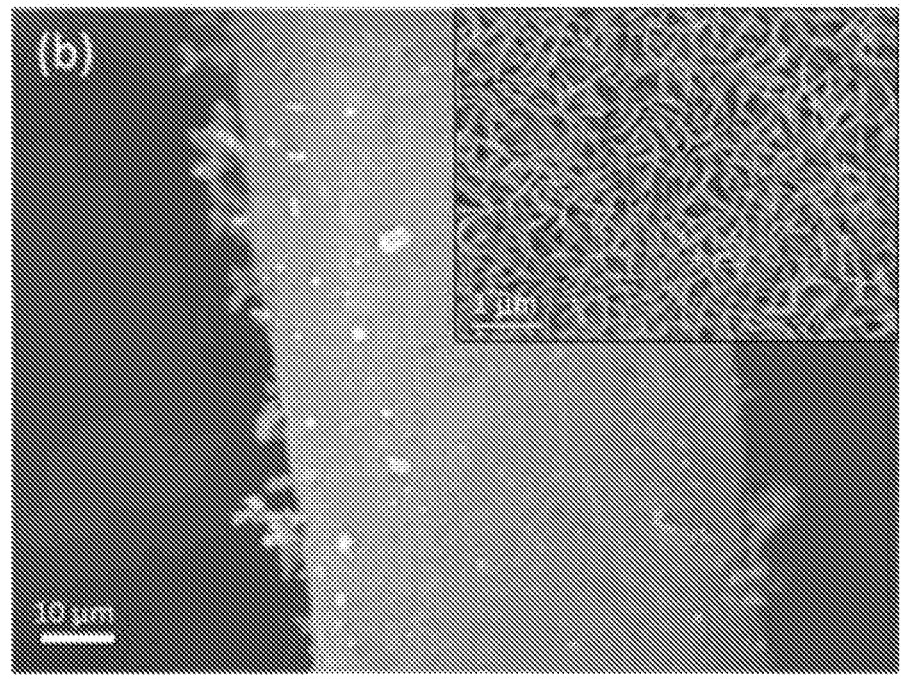
FIG. 2 shows a SEM image of vertical nanosheets of $SnS_2$ grown on surfaces of $SnS_2$ covering the surfaces of the 3DG of FIG. 1 and a high magnification inset.
Figure 3:
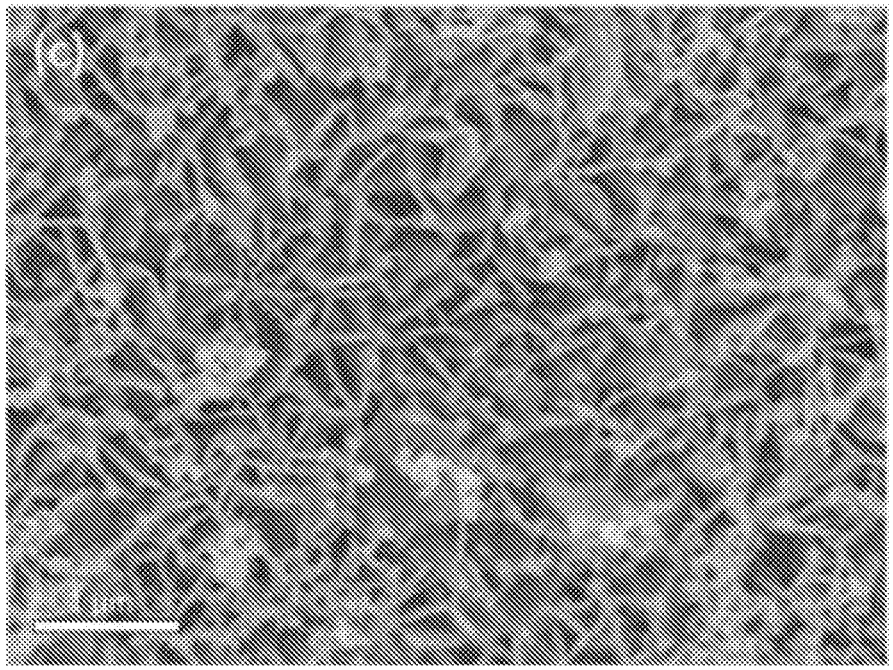
FIG. 3 shows a SEM image of fine nanosheets of $MoS_2$ grown on the surfaces of $SnS_2$ with small clusters of $MoS_2$ on the edges of $SnS_2$.
Figure 4:
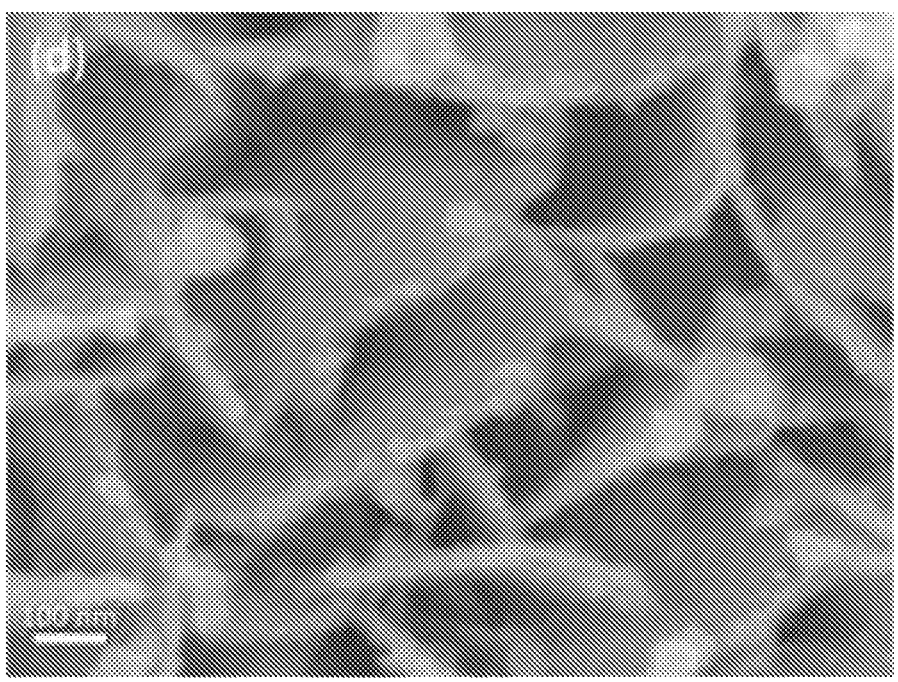
FIG. 4 shows a further view of the nanosheets of FIG. 3 in a higher resolution.

FIGS. 1 to 6 show the morphology of the products i.e. of 3DG, Sn$_2$/3DG, and of SnS$_2$/MoS$_2$/3DG in scanning electron microscope (SEM) images at different magnifications. FIG. 1 shows the 3-dimensional interconnected porous network of the Ni foam derived 3DG. The inset image shows the smooth nature of the surface of 3DG with crease and folds which are characteristic of the layered graphene/graphite. FIG. 2 shows vertical nanosheets of SnS$_2$ grown on the surfaces of SnS$_2$ covering the surfaces of 3DG. The SnS$_2$ nanosheets are highly dense but also possess gaps to expose its surface to react with lithium during charge-discharge cycles. FIGS. 3 and 4 show fine nanosheets of MoS$_2$ grown on the surfaces of SnS$_2$ with small clusters of MoS$_2$ on the edges of SnS$_2$.

Figure 6:
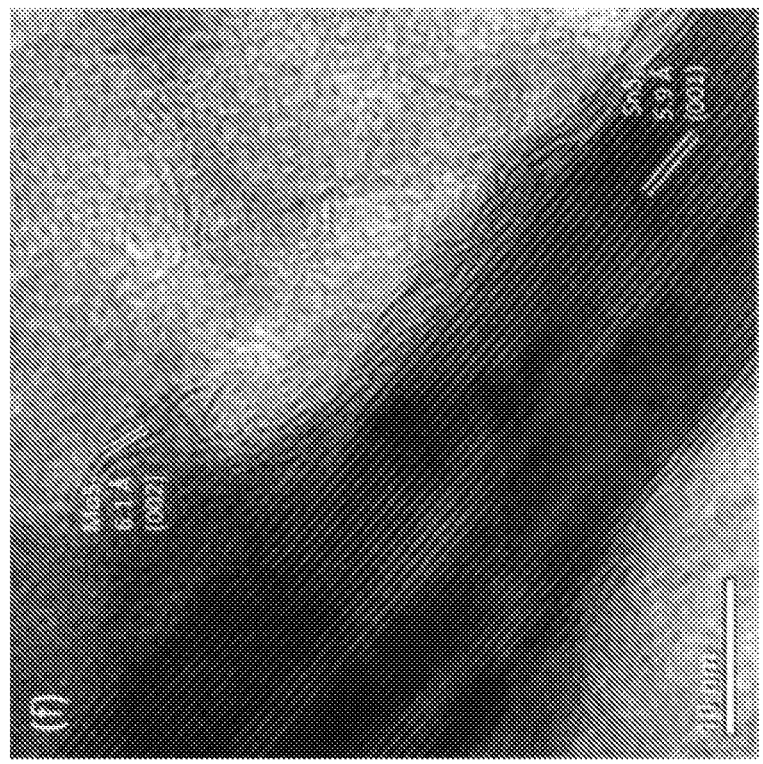
FIG. 6 shows a further transmission electron microscope image of the synthesized $SnS_2/MoS_2/3DG$ electrode.
Figure 5:
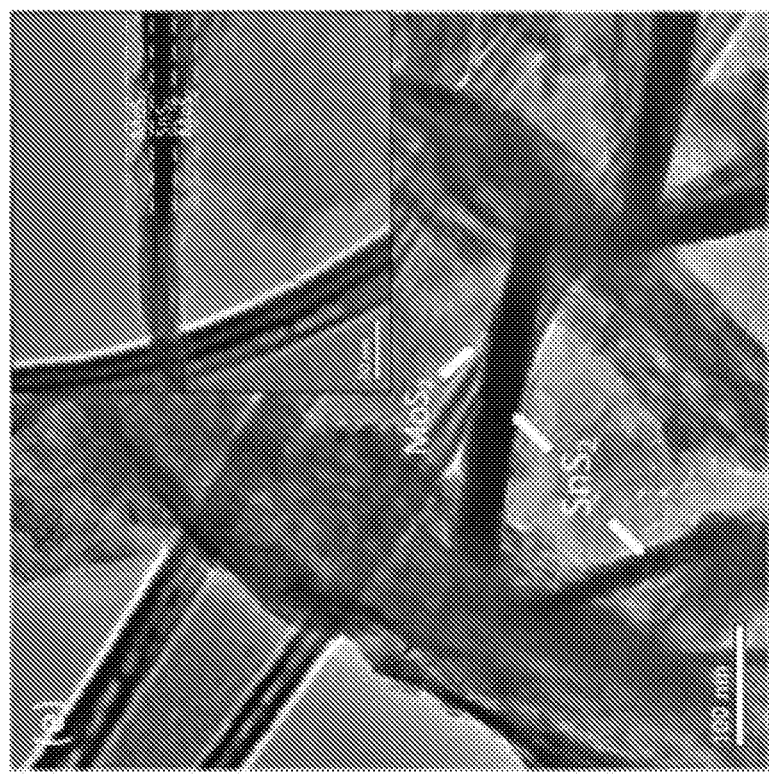
FIG. 5 shows a transmission electron microscope image of a synthesized $SnS_2/MoS_2/3DG$ electrode.

FIGS. 5 and 6 are high resolution transmission electron microscope (HRTEM) images of the SnS$_2$/MoS$_2$/3DG. The low magnification HRETEM of FIG. 5 shows dispersed vertical sheets of SnS$_2$ of ≈30 nm thick and ≈300 nm wide. The inset in FIG. 5 shows that the MoS$_2$ are grown on both sides of the SnS$_2$ sheets. High magnification HRTEM in FIG. 6 shows the crystal lattices, which confirms the thick sheet and the thin sheet to be SnS$_2$, which has a lattice constant of 5.9 Å and MoS$_2$, which has a lattice constant of 6.1 Å, respectively.

Figure 7:
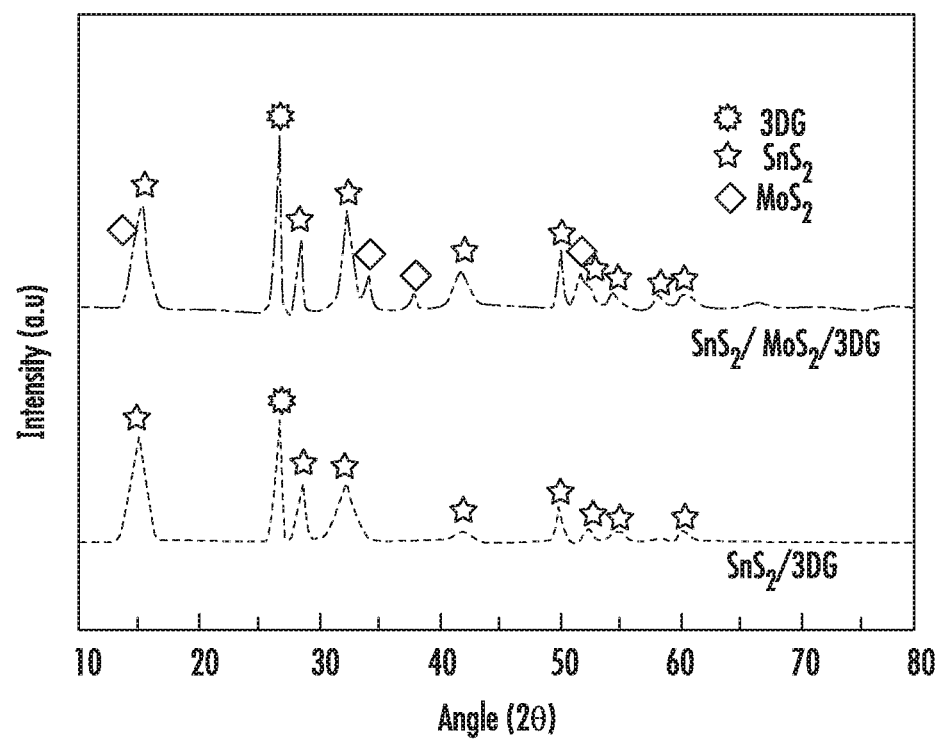
FIG. 7 shows X-ray diffraction (XRD) patterns of the $SnS_2/MoS_2/3DG$ electrode and the intermediate $SnS_2/3DG$ material.
Figure 8:
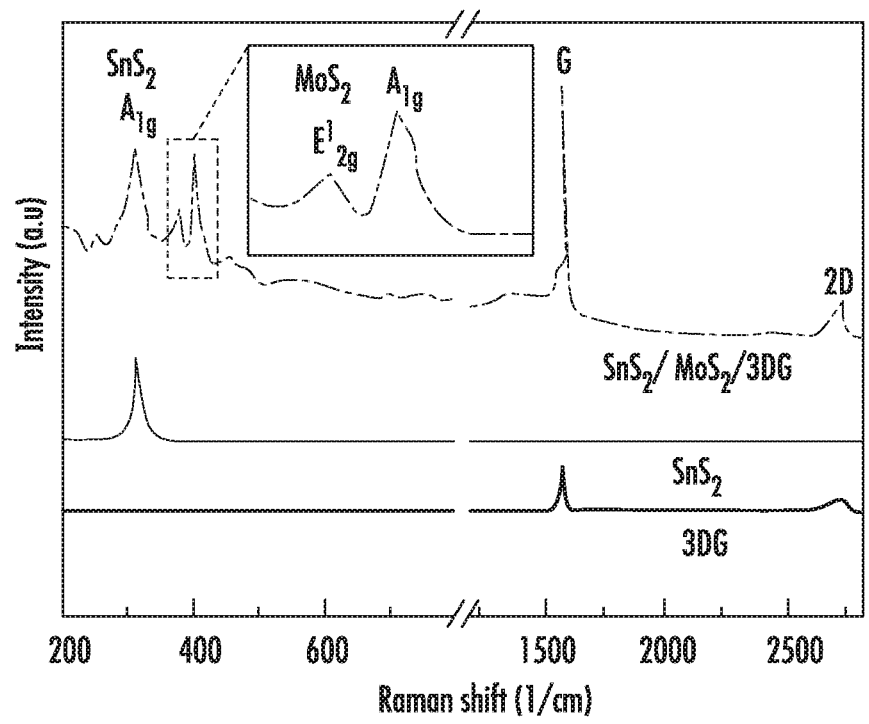
FIG. 8 shows a Raman spectrum of the synthesized $SnS_2/MoS_2/3DG$ electrode, and for pure $SnS_2$ and 3DG as references.
Figure 9:
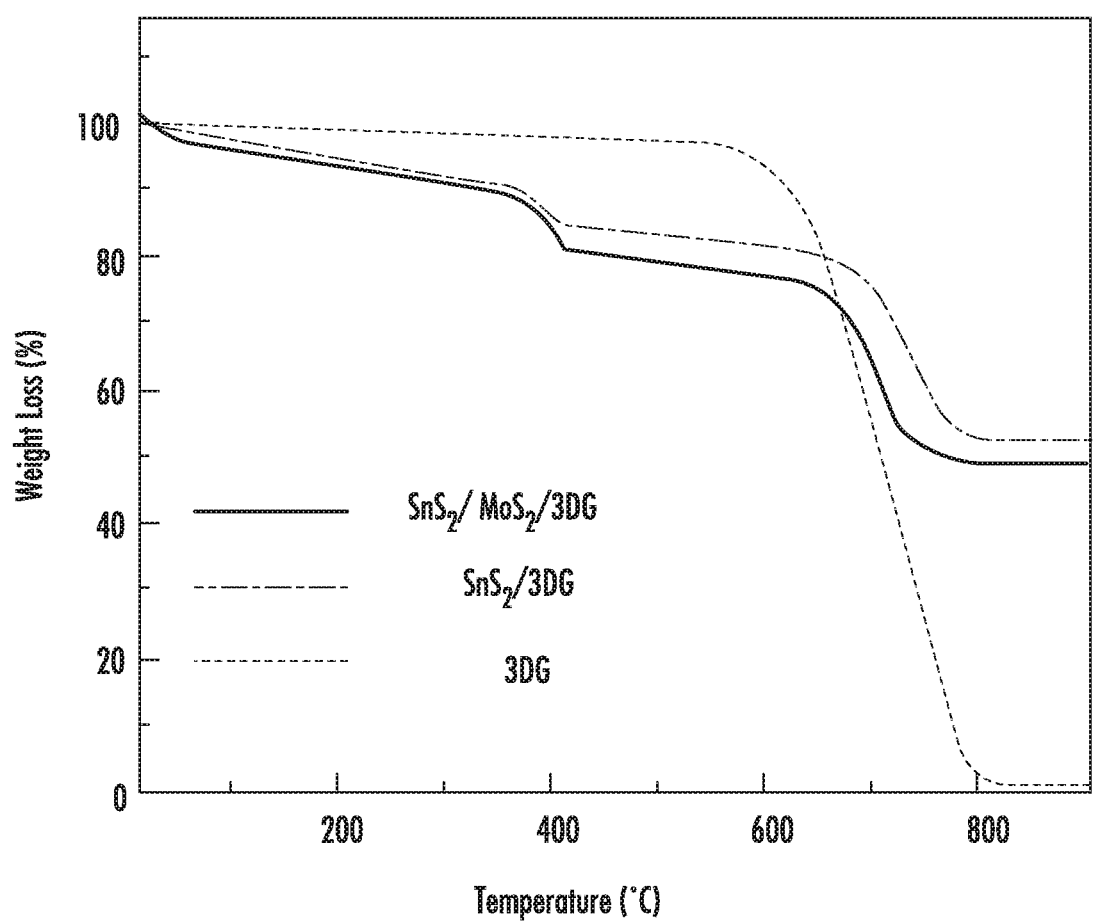
FIG. 9 shows thermogravimetric analysis (TGA) curves for the $SnS_2/MoS_2/3DG$, $SnS_2/3DG$ and 3DG materials.

FIGS. 7 to 9 show further evidences that the as-synthesized final and intermediate products are indeed composed of SnS$_2$, MoS$_2$ and 3DG. FIG. 7 shows X-ray diffraction (XRD) patterns of SnS$_2$/MoS$_2$/3DG and intermediate SnS$_2$/3DG with peaks corresponding well with reference peaks of Joint Committee on powder Diffraction Standards (JCPDS) card no. 65-3656 for MoS2, JCPDS card no. 23-0677 for SnS$_2$, and JCPDS card no. 75-1621 for graphite.

FIG. 8 shows the Raman spectrum for the synthesized SnS$_2$/MoS$_2$/3DG material, and for pure SnS$_2$ and 3DG as references. The peak at 315/cm corresponds to the Raman mode A$_{1g}$ of SnS$_2$, while the peaks at 380/cm and 405/cm correspond to the Raman mode E$^1_{2g}$ and to the Raman mode A$_{1g}$ of MoS$_2$, wherein the Raman modes are denoted by the Mulliken symbols E$^1_{2g}$ and A$_{1g}$. The peaks at 1575/cm and 2715/cm correspond to G and 2D bands of the graphitic layers in 3DG.

FIG. 9 shows the thermogravimetric analysis (TGA) curves for the SnS$_2$/MoS$_2$/3DG, SnS$_2$/3DG and 3DG materials. The initial weight loss of ≈29.5% for both SnS$_2$/MoS$_2$/3DG and SnS$_2$/3DG between 550° C. to 850° C. arises from the combustion of 3DG. Therefore, the final weight composition of the products can be calculated to be about 69% SnS$_2$ and 31% 3DG in SnS$_2$/3DG and 66% SnS$_2$, 5% MoS$_2$, and 28% 3DG.

Figure 10:
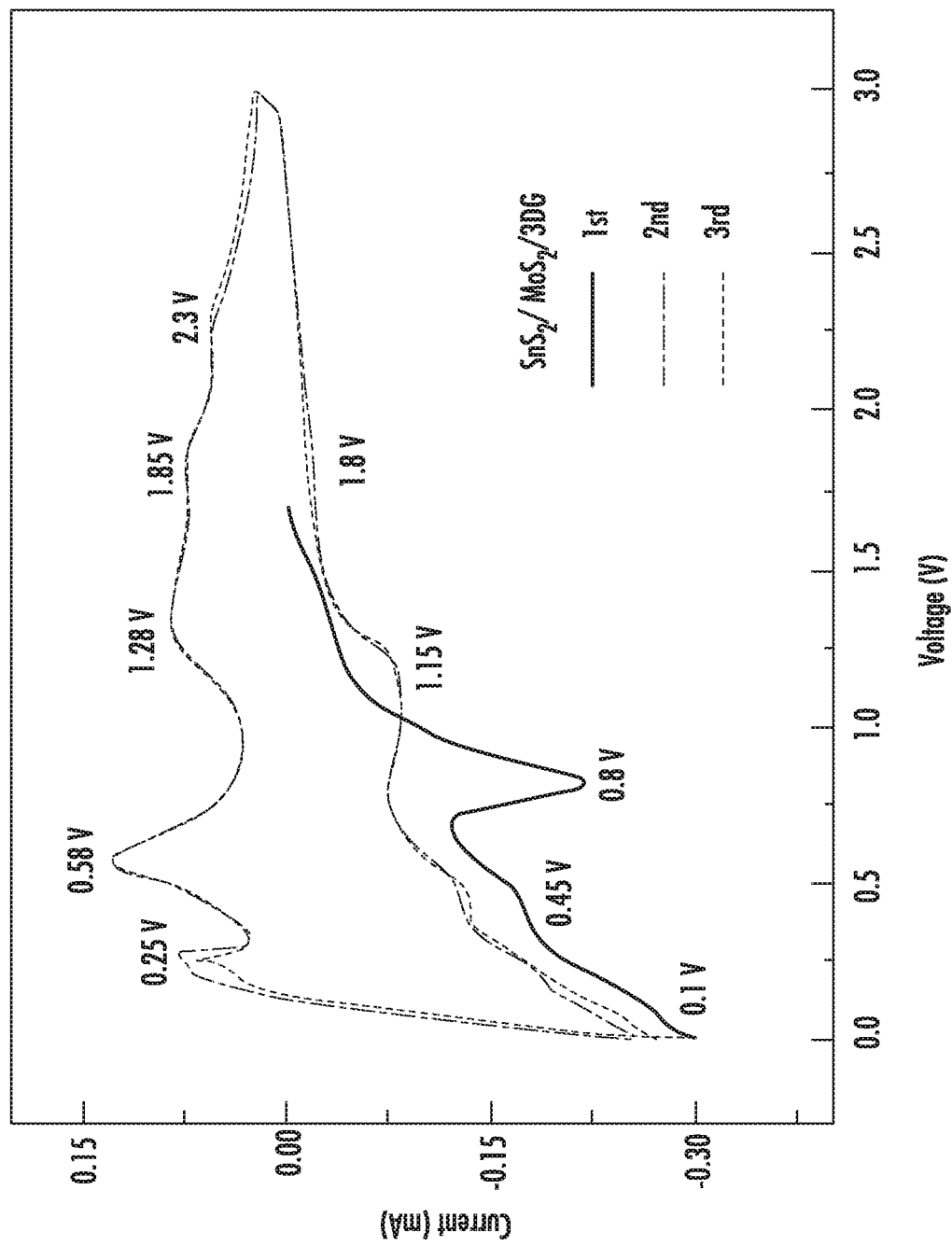
FIG. 10 shows a cyclic voltammetry (CV) curve of the $SnS_2/MoS_2/3DG$ electrode.
Figure 11:
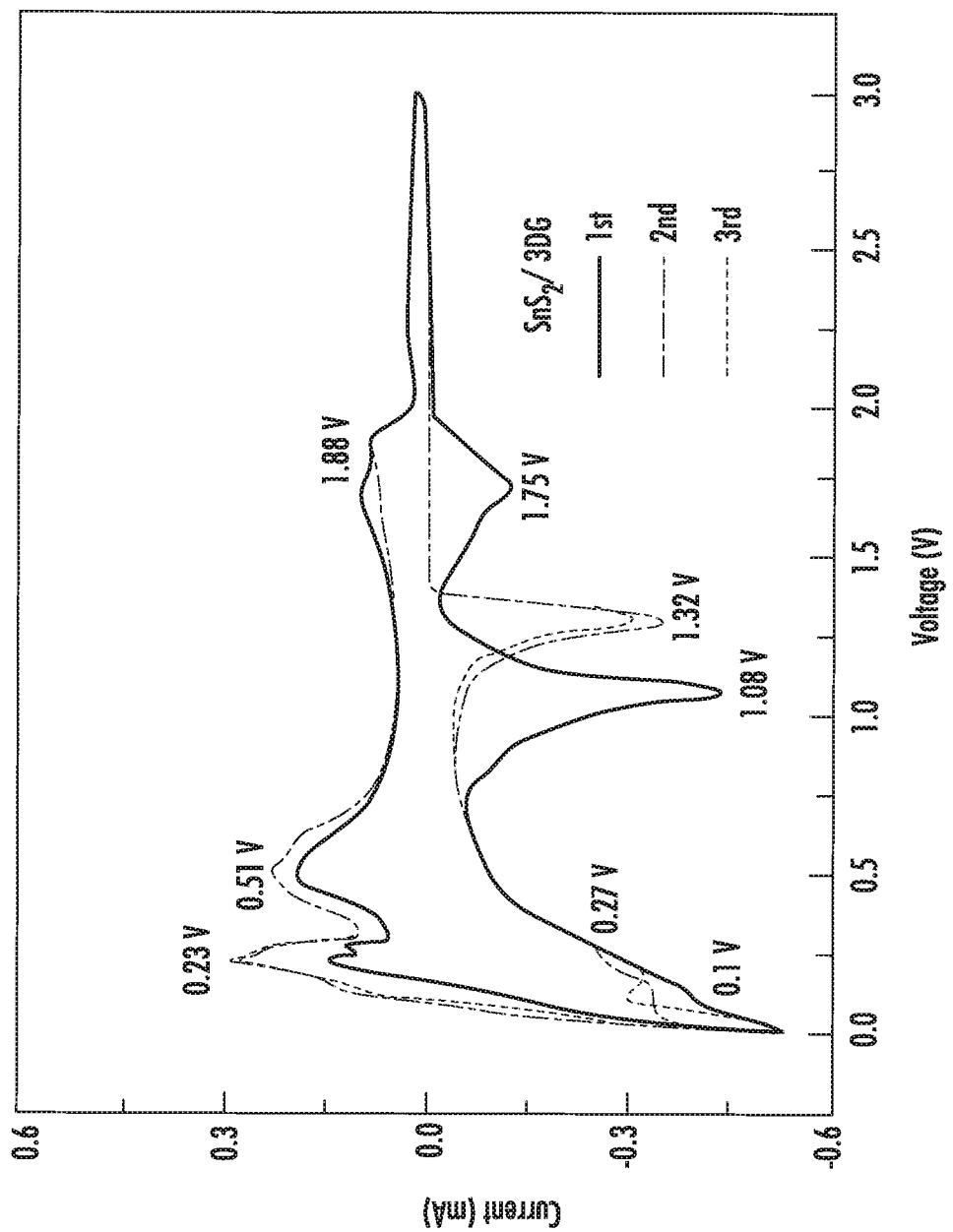
FIG. 11 shows a CV curve of a $SnS_2/3DG$ control electrode.
Figure 12:
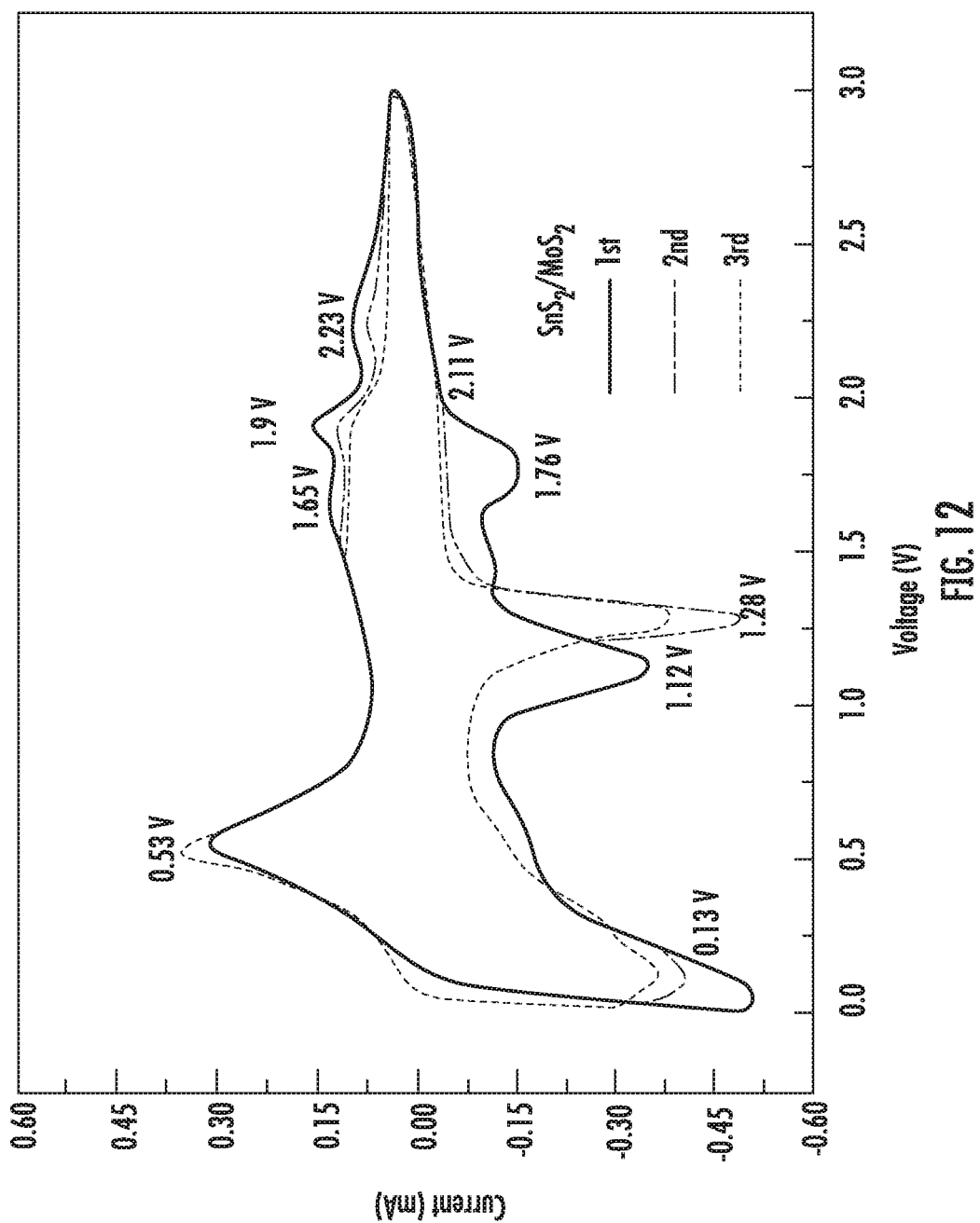
FIG. 12 shows a CV curve of a $Sns_2/MoS_2$ control electrode.
Figure 13:
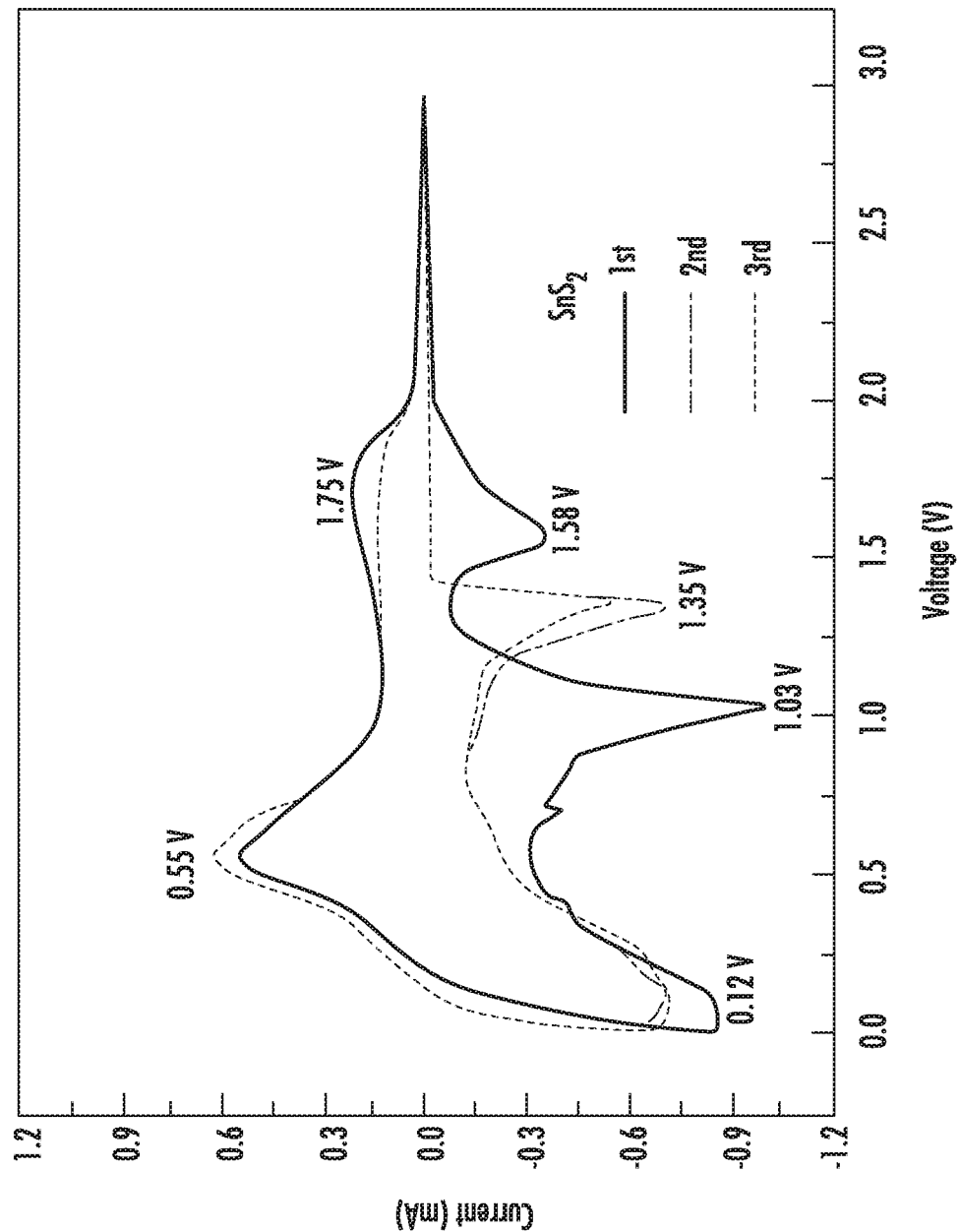
FIG. 13 shows a CV curve of a $SnS_2$ control electrode.

FIGS. 10 to 13 show the cyclic voltammetry (CV) curves of all prepared electrodes in the abovementioned experimental setup. Namely, FIG. 10 shows a CV curve of a SnS$_2$/MoS$_2$/3DG electrode, FIG. 11 shows a CV curve of a SnS$_2$/3DG electrode, FIG. 12 shows a CV curve of a Sns$_2$/MoS$_2$ electrode and FIG. 13 shows a CV curve of a SnS$_2$ electrode.

In the first charge-discharge cycles, SnS$_2$ undergoes an intercalation of lithium ions as described in equation (1) and (2), which leads to the cathodic peaks at 1.75 V for SnS$_2$/3DG, at 1.76 V for SnS$_2$/MoS$_2$, and at 1.03 V for SnS$_2$. For the 3DG containing samples, the redox pairs at 8.1 V and 0.25 V for SnS$_2$/MoS$_2$/3DG and at 0.1V and 0.23V for SnS$_2$/3DG arise from the intercalation of Li into the graphitic layers.

In subsequent cycles, the redox peaks around 0.2 V and 0.5 V correspond to the reversible alloying/de-alloying reaction as described in equation (4). Furthermore, the redox pairs at 1.15V and 1.85V for SnS$_2$/MoS$_2$/3DG, at 1.32 V and 1.88 V for SnS$_2$/3DG, at 1.28 V and 1.9V for SnS$_2$/MoS$_2$, and at 1.35 V and 1.75 V for SnS$_2$ correspond to the reversible decomposition of Li$_2$S, which is described by the reverse direction of equation (3)). These peaks correspond well with published results in reference (1) and reference (2).

It can also be observed that except for SnS$_2$/MoS$_2$/3DG, the intensity of these peaks reduces significantly from cycles 2 to 3. This implies that the decomposition of Li$_2$S in these materials is only partially reversible. By contrast, the overlapping peaks for SnS$_2$/MoS$_2$/3DG suggest a highly reversible decomposition of Li$_2$S, which demonstrates the catalytic effect of MoS$_2$ in the composite. However, the control sample of SnS$_2$/MoS$_2$ showed only partial reversibility despite the MoS$_2$ doping. This could be due to the poor morphology of SnS$_2$/MoS$_2$, where the bulk SnS$_2$ and MoS$_2$ nanosheets lack a volume change buffer function, which resulted in rapid capacity decay over cycling.

Additional anodic peaks at 1.28 V for SnS$_2$/MoS$_2$/3DG and at 1.65 V for SnS$_2$/3DG, which correspond to the intercalation reaction, and at 2.3 V for SnS$_2$/MoS$_2$/3DG and at 2.11 V for SnS$_2$/3DG, which correspond to the conversion reaction of $MoS_2$ with lithium, are also present in $MoS_2$ containing samples and are described by equations (5) and (6) respectively.

During the first charging an insertion reaction takes place at the anode, which is described by the reaction equation $$SnS_2 + xLi^+ + xe^- \rightarrow Li_xSnS_2 \quad (1')$$

Furthermore, a conversion reaction takes place which is described by the reaction equation $$Li_xSnS_2 + (4-x)Li^+ + (4-x)e^- \rightarrow Sn + 2Li_2S \quad (2')$$

Inserting the left hand side of equation (1') into equation (2') yields the simplified conversion reaction equation $$SnS_2 + 4Li^+ + 4e^- \rightarrow Sn + 2Li_2S \quad (3')$$

In subsequent charge-discharge cycles an alloying/de-alloying process takes place, which is described by the following equation $$Sn + 4.4Li^+ + 4.4e^- \leftrightarrow Li_{4.4}Sn \quad (4')$$

wherein the left-to-right arrow relates to charging and the right-to-left arrow to discharging.

Moreover, the following reactions involving the catalyzer or catalyst $MoS_2$ take place at the anode. An insertion reaction is described by $$MoS_2 + yLi^+ + ye^- \rightarrow Li_yMoS_2 \quad (5)$$

and a conversion reaction is described by $$MoS_2 + 4Li^+ + 4e^- \leftrightarrow Mo + 2Li_2S \quad (6),$$

where x and y are the number of moles of $Li^+/e^-$ reacting with $SnS_2$ and $MoS_2$, respectively.

The experiments of the present specification were carried out on an experimental lithium-ion battery. A lithium-ion battery according to the present specification may in general comprises various modifications and differences from this experimental setup. For example, the cathode can be provided by a transition metal oxide such as $LiMO_2$, wherein M is a transition metal such as cobalt or nickel.

Moreover, a production method of the battery may be modified as required to meet requirements such as cost efficiency, mass production, security standards and environmental standards.

FIGS. 14 to 17 illustrate lithium storage improvements brought about by the addition of $MoS_2$ in $SnS_2/3DG$.

Figure 14:
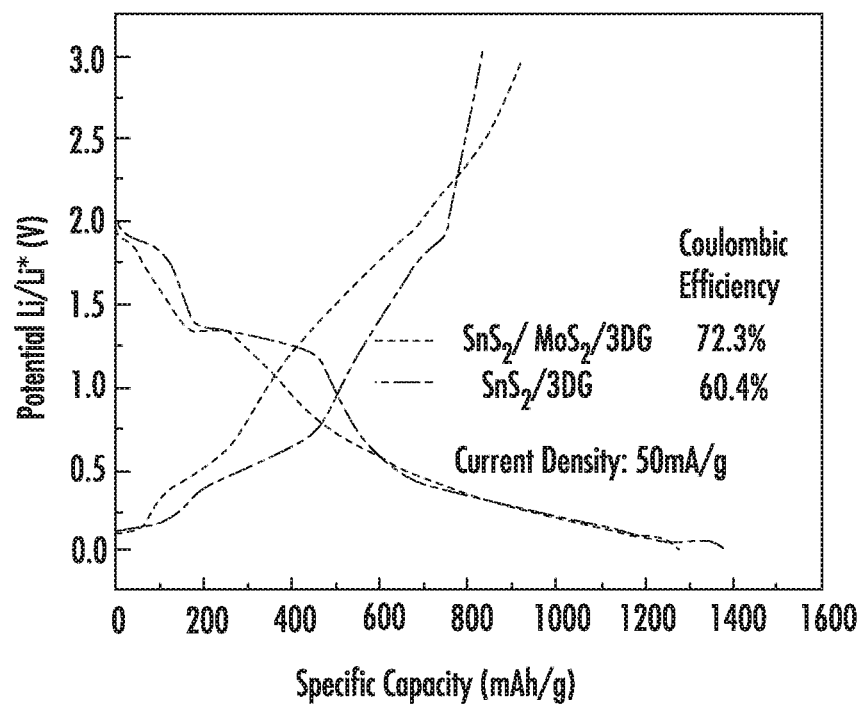
FIG. 14 shows charge-discharge profiles of $SnS_2/MoS_2/3DG$ and $SnS_2/3DG$ materials.

FIG. 14 shows first galvanostatic discharge and charge curves for SnS2/MoS2/3DG and SnS2/3DG at a current density of 50 mA/g in the potential range of 0.01 V to 3.0 V. In FIG. 14, the charge-discharge profiles of both $SnS_2/MoS_2/3DG$ and $SnS_2/3DG$ are fairly similar with the exception of a sharp incline in the charging curve of $SnS_2/3DG$ between 2.0 to 3.0 V, which corresponds well with the CV curves in FIG. 11. On the other hand, $SnS_2/MoS_2/3DG$ displayed a gradual ascending slope between 2.0 to 3.0 V, which is attributed to the decomposition of $Li_2S$ and reactions of $MoS_2$ with lithium.

In terms of first cycle coulombic efficiency, $SnS_2/3DG$ displayed a large capacity loss (39.6%) due to the formation of a surface electrolyte interface (SEI) layer as well as "trapped" lithium as a result of a partially reversible formation of $Li_2S$. By contrast, the decomposition of $Li_2S$, which is mediated by the catalytic reaction of $MoS_2$, greatly improved the first cycle coulombic efficiency of $SnS_2/MoS_2/3DG$ from 60.4% to 72.3%.

Figure 15:
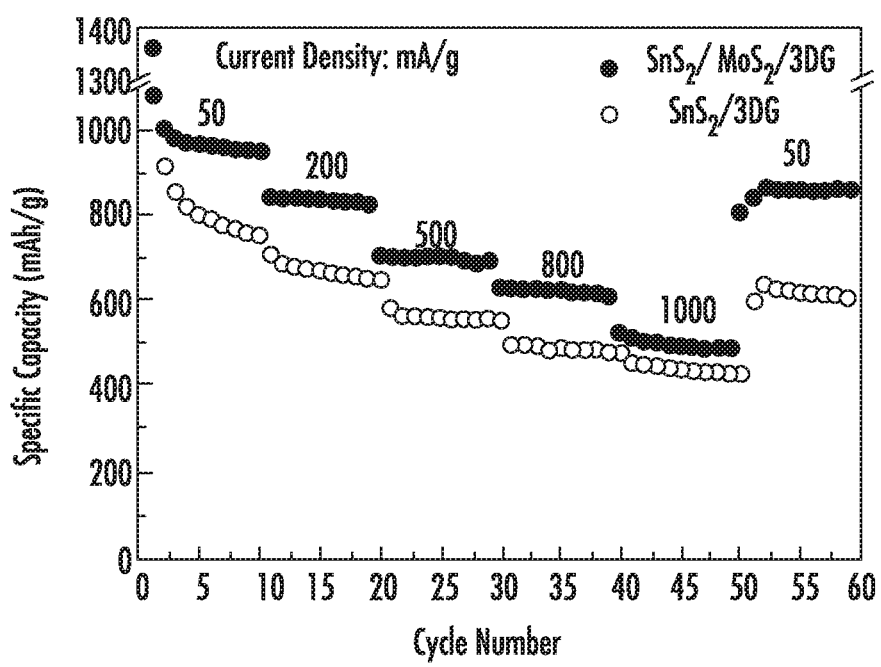
FIG. 15 shows the rate capability of the $SnS_2/MoS_2/3DG$ electrode and the $SnS_2/3DG$ control electrode.

FIG. 15 illustrates the performance of the $SnS_2/MoS_2/3DG$ anode in the experimental setup. Specifically, FIG. 15 shows the rate capability of $SnS_2/MoS_2/3DG$ and $SnS_2/3DG$.

Figure 16:
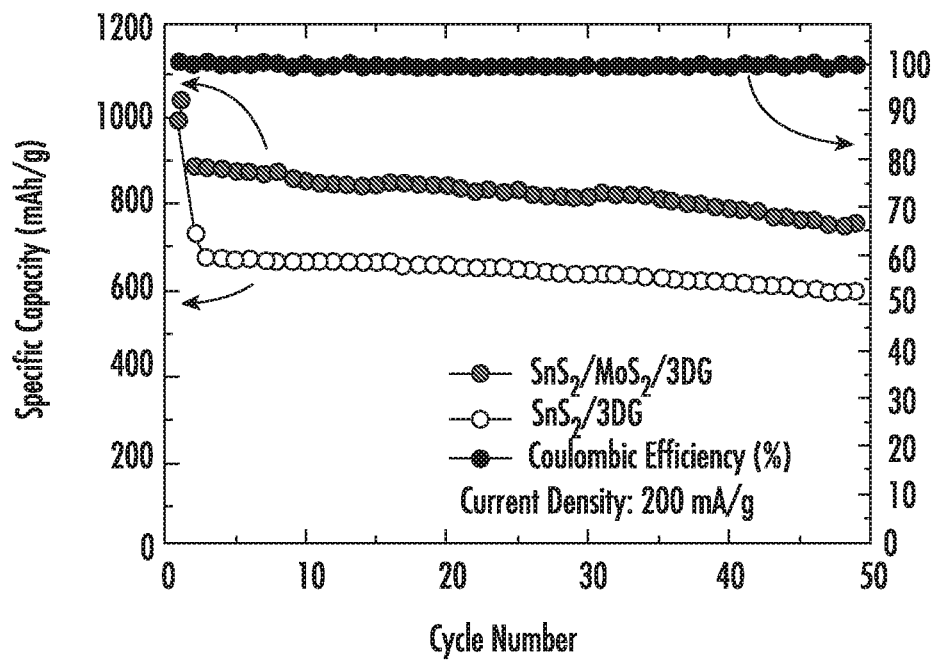
FIG. 16 shows the coulombic efficiency and the cycling performance of the $SnS_2/MoS_2/3DG$ electrode and the cycling performance of the $SnS_2/3DG$ control electrode at a current density of 200 mA/g.
Figure 17:
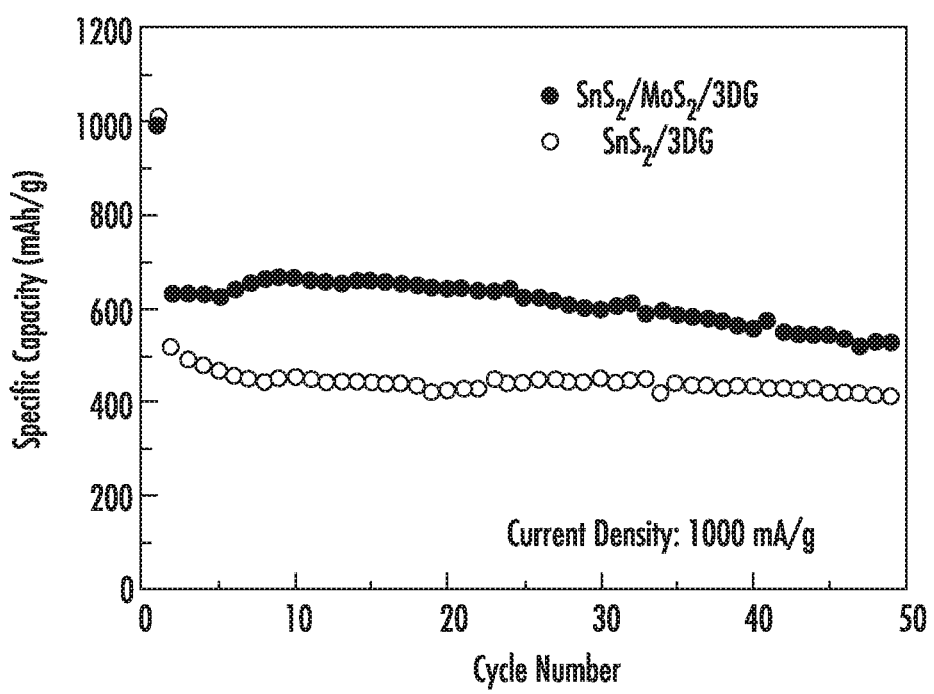
FIG. 17 shows the cycling performance of the $SnS_2/MoS_2/3DG$ electrode and of the $SnS_2/3DG$ control electrode at a current density of 1000 mA/g.

FIGS. 16 and 17 demonstrate the cycling stability of the materials over 50 cycles at 200 mA/g and 1000 mA/g, respectively. Specifically, FIG. 16 shows the cycling performance of $SnS_2/MoS_2/3DG$ and $SnS_2/3DG$ at a current density of 200 mA/g and the corresponding coulombic efficiency of $SnS_2/MoS_2/3DG$. The arrows in FIG. 16 indicate the vertical scale that corresponds to the experimental values. FIG. 17 shows the cycling performance of $SnS_2/MoS_2/3DG$ and $SnS_2/3DG$ at a current density of 1000 mA/g. The cycling stability shows the effectiveness of the 3D hierarchical nanostructures of the $SnS_2/MoS_2/3DG$ composites to mitigate volume changes occurring during alloying/de-alloying and conversion reactions.

Figures 18, 19:
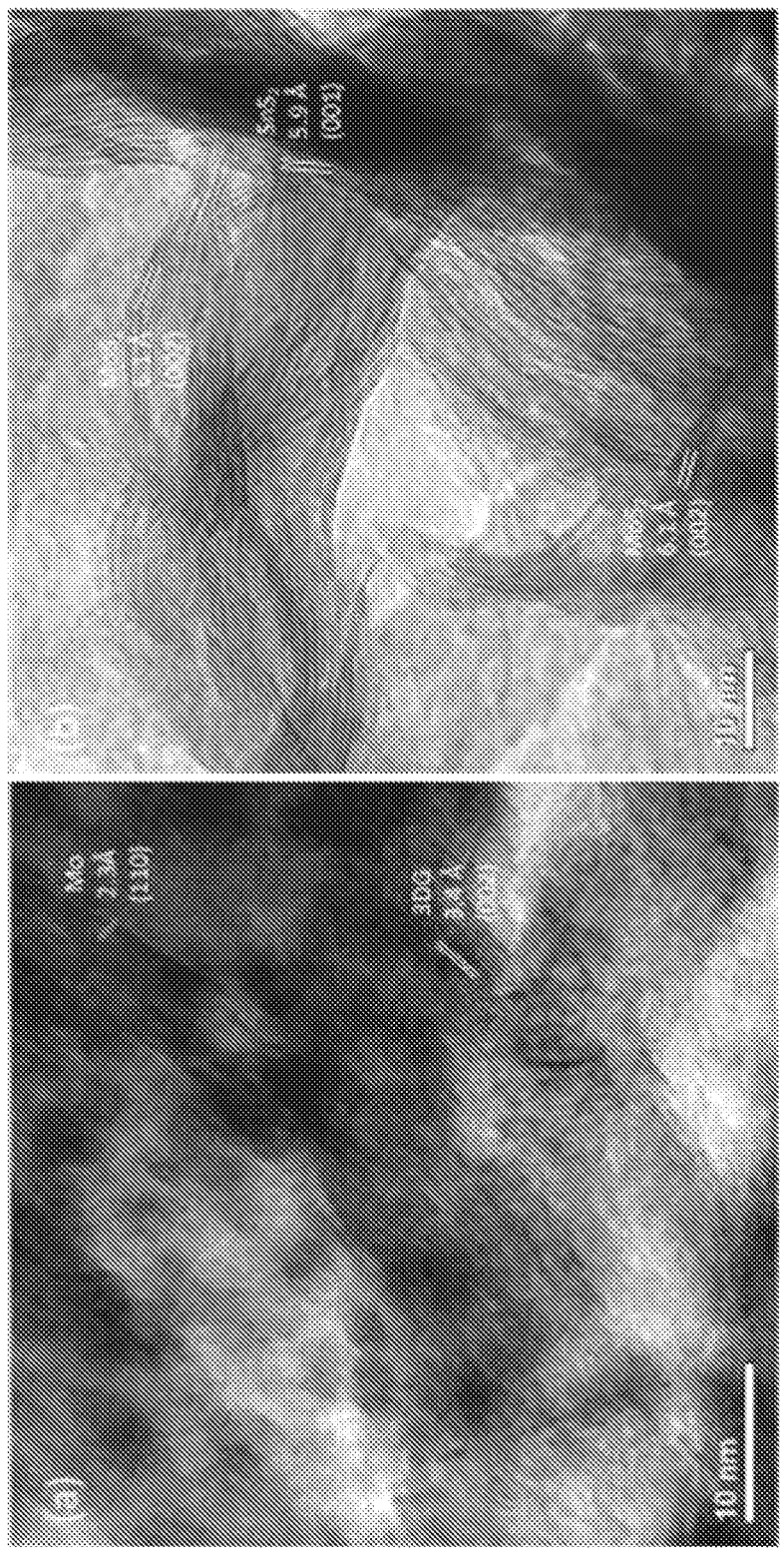
FIG. 18 shows a high resolution transmission electron microscopy of a $SnS_2/MoS_2/3DG$ electrode after 20 cycles in a fully discharged state.
FIG. 19 shows a high resolution transmission electron microscopy of a $SnS_2/MoS_2/3DG$ electrode after 20 cycles in a fully charged state.

The FIGS. 18 and 19 show ex-situ high resolution transmission electron microscopy (HRTEM), which was carried out on $SnS_2/MoS_2/3DG$ to provide additional supporting evidence to show the catalytic effect of $MoS_2$ to fully reduce $Li_2S$ and release the "trapped" lithium as described by the typical irreversible/partially reversible reaction of equation (3).

This was carried out by disassembling coin cells that were in either fully charged state at 3.0 V, as shown in FIG. 19, or fully discharged state at 0.01V, as shown in FIG. 18, after 20 charge-discharge cycles and washing the electrodes in N-Methyl-2-pyrrolidone (NMP).

As shown in FIG. 18, at the fully discharged state the presence of Mo suggests the reversible conversion of $MoS_2$, whereas the absence of $SnS_2$ implies the complete alloying of Sn with Li, which is described in equations (4) and (5). However, $Li_2Sn$ could not be identified in the HRTEM images, which was possibly due to the non-crystalline phase of $Li_2Sn$, see reference (4).

In the fully charged state of FIG. 19, lattices of $MoS_2$ and $SnS_2$ could be clearly identified. This shows that even after 20 cycles, $Li_2S$ could be decomposed resulting in the formation of $SnS_2$. Therefore, the reversibility of the reaction in equation (3) is clearly evident.

Figure 20:
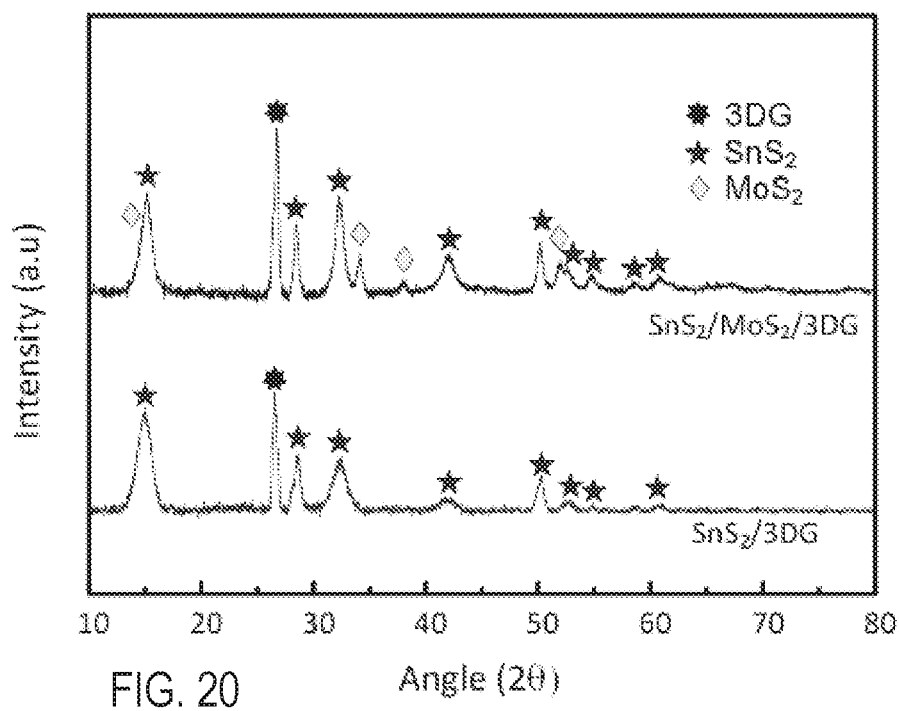
FIG. 20 shows further X-ray diffraction (XRD) patterns of the $SnS_2/MoS_2/3DG$ electrode and the intermediate $SnS_2/3DG$ material.
Figure 21:
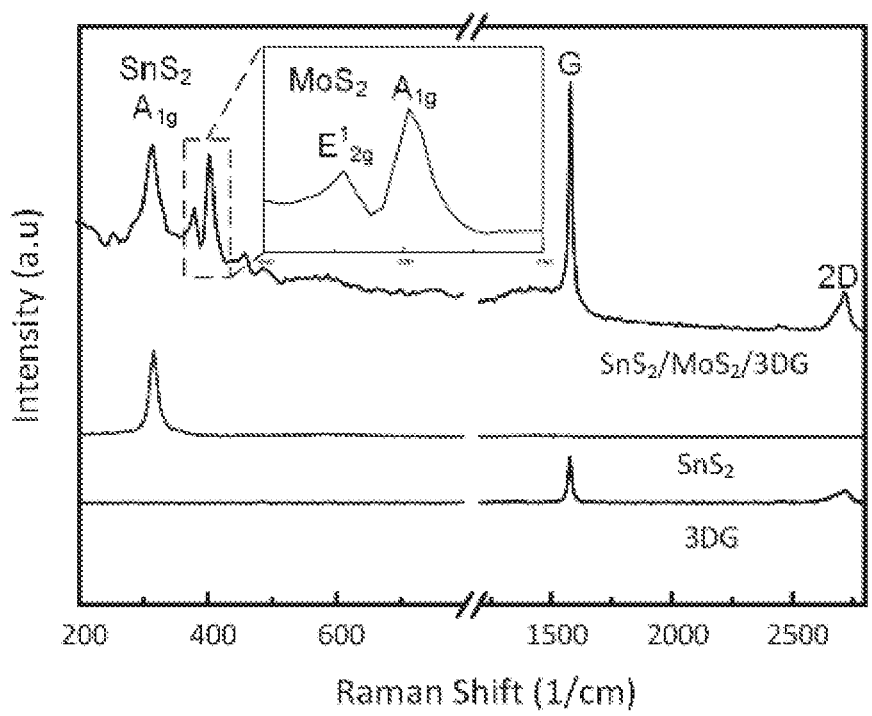
FIG. 21 shows a further Raman spectrum of the synthesized $SnS_2/MoS_2/3DG$ electrode, and for pure $SnS_2$ and 3DG as references.
Figure 22:
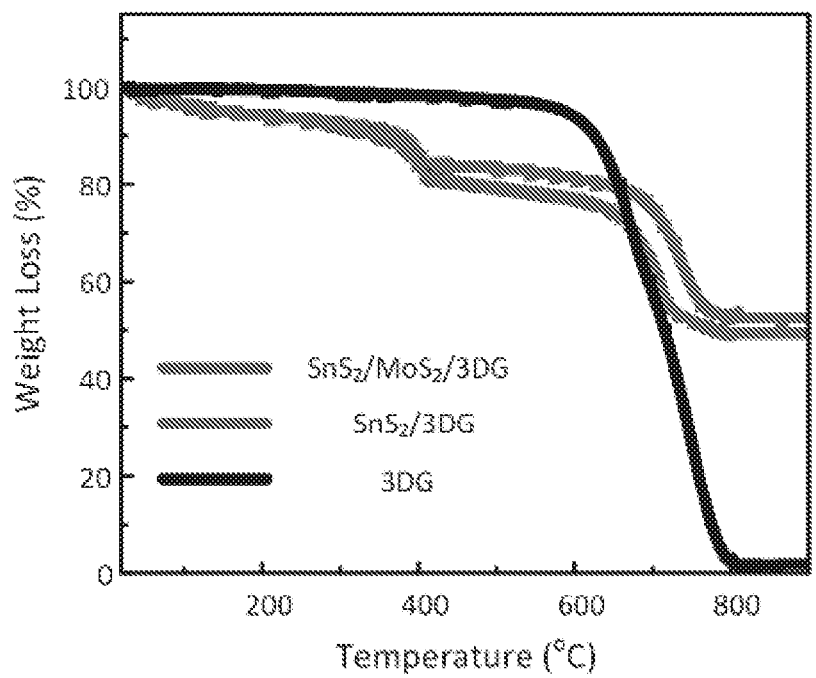
FIG. 22 shows further thermogravimetric analysis (TGA) curves for the $SnS_2/MoS_2/3DG$, $SnS_2/3DG$ and 3DG materials.

The FIGS. 20, 21 and 22 provide further evidence of the as-synthesized final and intermediate products to be composed of $SnS_2$, $MoS_2$, and 3DG.

FIG. 20 shows X-ray diffraction (XRD) patterns of $SnS_2/MoS_2/3DG$ and intermediate $SnS_2/3DG$ with peaks corresponding well with reference peaks of Joint Committee on Powder Diffraction Standards (JCPDS) card no. 65-3656 for $MoS_2$, JCPDS card no. 23-0677 for $SnS_2$, and JCPDS card no. 75-1621 for graphite.

FIG. 21 shows the Raman spectrum for the $SnS_2/MoS_2/3DG$ and $SnS_2/3DG$ and 3DG as references. The peak at 315/cm corresponds to A1g mode of $SnS_2$ while the peaks at 380/cm and 405/cm corresponds to E12g and A1g mode of $MoS_2$. The peaks at 1575/cm and 2715/cm corresponds to G and 2D bands of the graphitic layers in 3DG.

FIG. 22 shows thermogravimetric analysis (TGA) curves for the $SnS_2/MoS_2/3DG$, $SnS_2/3DG$, and 3DG. The initial weight loss of ~5% for $SnS_2/MoS_2/3DG$, $SnS_2/3DG$ between 25 to 150° C. is attributed to the moisture content on the samples. The weight loss of ~15% ($SnS_2/MoS_2/3DG$) and ~12% ($SnS_2/3DG$) between 200 to 550° C. corresponds to the oxidation of $SnS_2$ and $MoS_2$. Lastly, the weight loss of ~29.5% for both $SnS_2/MoS_2/3DG$ and $SnS_2/3DG$ between 550° C. to 850° C. arises from the combustion of 3DG. Therefore, the final weight composition of the products can be calculated to be about 67% $SnS_2$ and 33% 3DG in $SnS_2/3DG$ and 65% $SnS_2$, 3% $MoS_2$, and 32% 3DG.

FIGS. 23 to 26 illustrates properties related to charge and discharge cycles.

Figure 23:
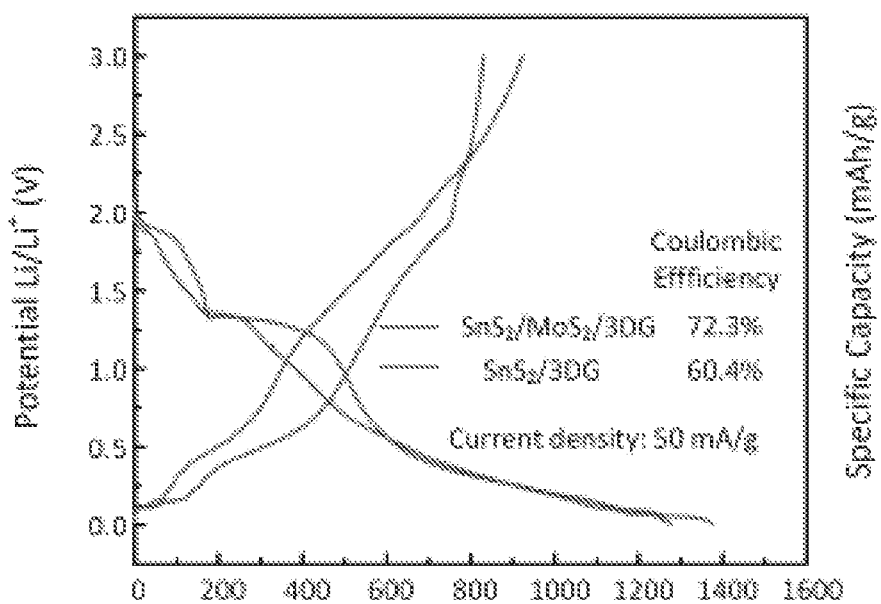
FIG. 23 shows further charge-discharge profiles of $SnS_2/MoS_2/3DG$ and $SnS_2/3DG$ materials.

FIG. 23 shows first galvanostatic discharge and charge curves for SnS$_2$/MoS$_2$/3DG and SnS$_2$/3DG at a current density of 50 mA/g in the potential range of 0.01 to 3.0 V.

Figure 24:
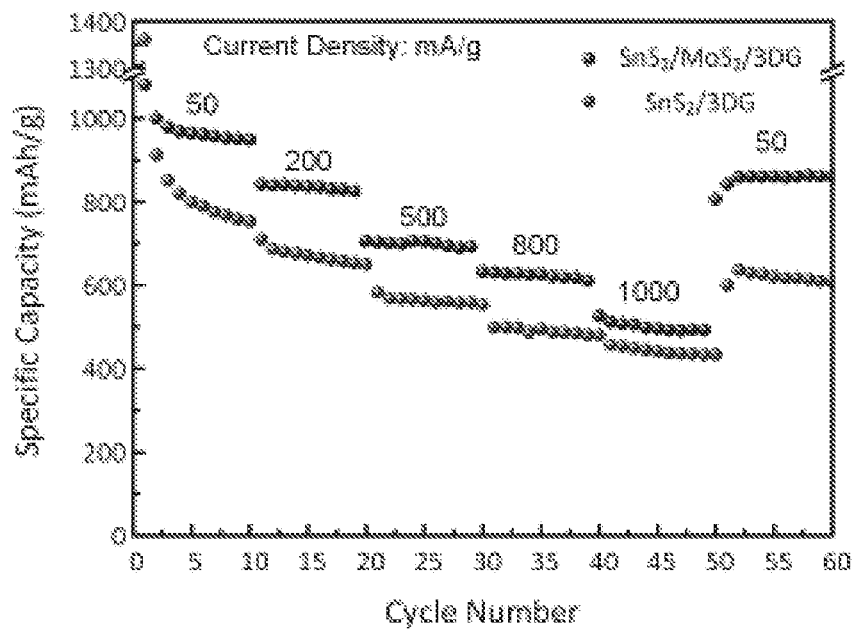
FIG. 24 shows a further diagram of the rate capability of the $SnS_2/MoS_2/3DG$ electrode and the $SnS_2/3DG$ control electrode.

FIG. 24 shows a rate capability of SnS$_2$/MoS$_2$/3DG and SnS$_2$/3DG.

Figure 25:
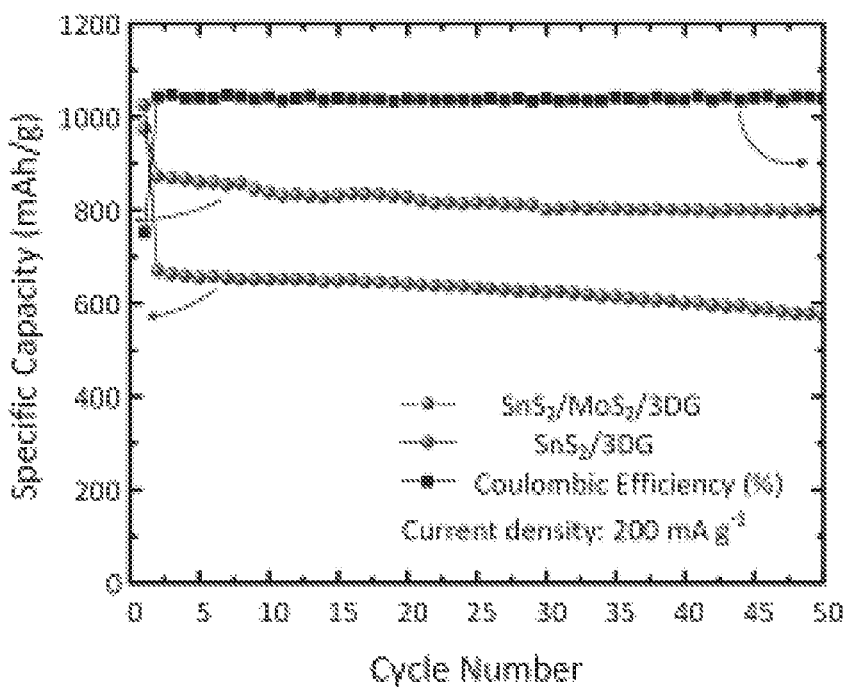
FIG. 25 shows a further diagram of the coulombic efficiency and the cycling performance of the $SnS_2/MoS_2/3DG$ electrode and the cycling performance of the SnS2/3DG control electrode at a current density of 200 mA/g.

FIG. 25 shows a cycling performance of SnS$_2$/MoS$_2$/3DG and SnS$_2$/3DG at current density of 200 mA/g and the corresponding coulombic efficiency of SnS$_2$/MoS$_2$/3DG.

Figure 26:
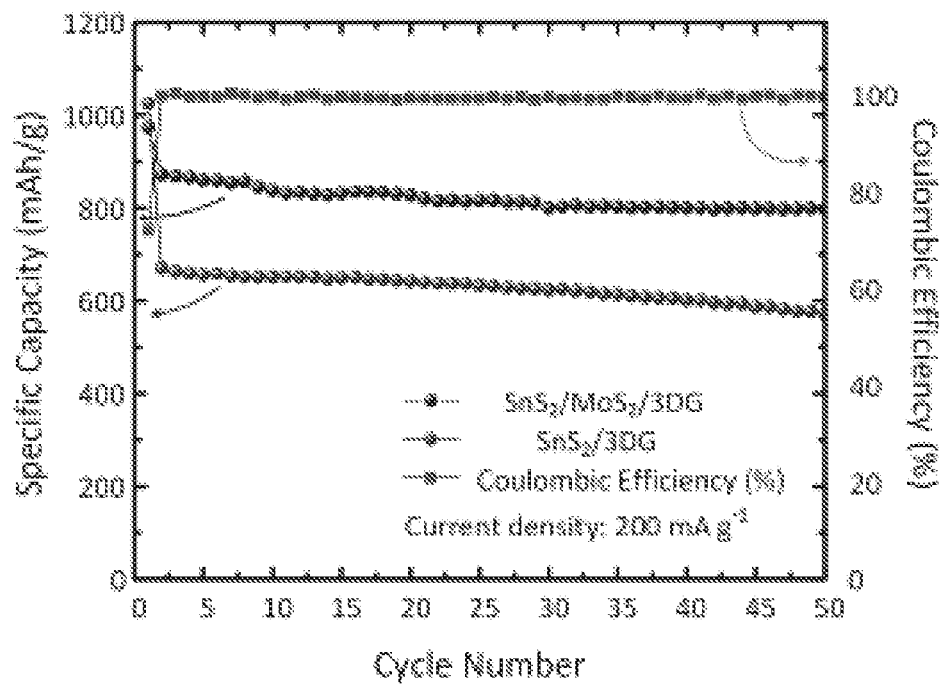
FIG. 26 shows a further diagram of the cycling performance of the $SnS_2/MoS_2/3DG$ electrode and of the SnS2/3DG control electrode at a current density of 1000 mA/g.

FIG. 26 shows a cycling performance of SnS$_2$/MoS$_2$/3DG and SnS$_2$/3DG at current density of 1000 mA/g.

Figure 28:
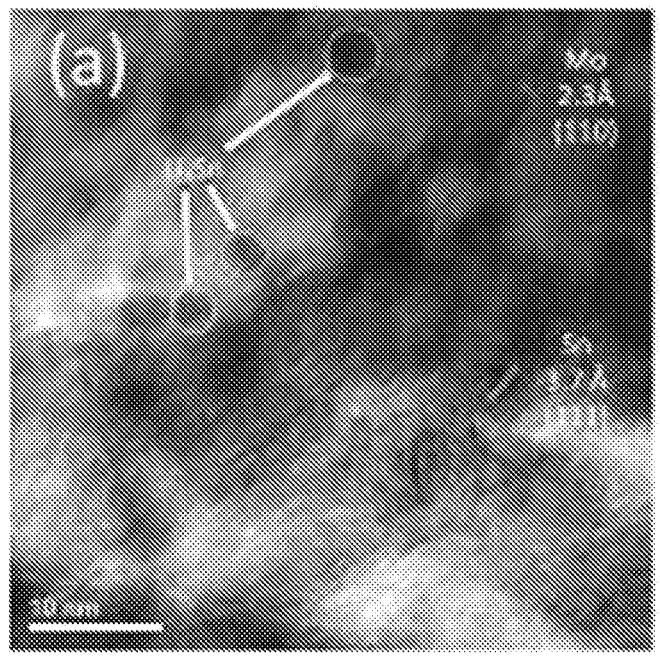
FIG. 28 shows an ex-situ HRTEM image of $SnS_2/MoS_2/3DG$ after 30 cycles and being discharged to 0.01 V.
Figure 29:
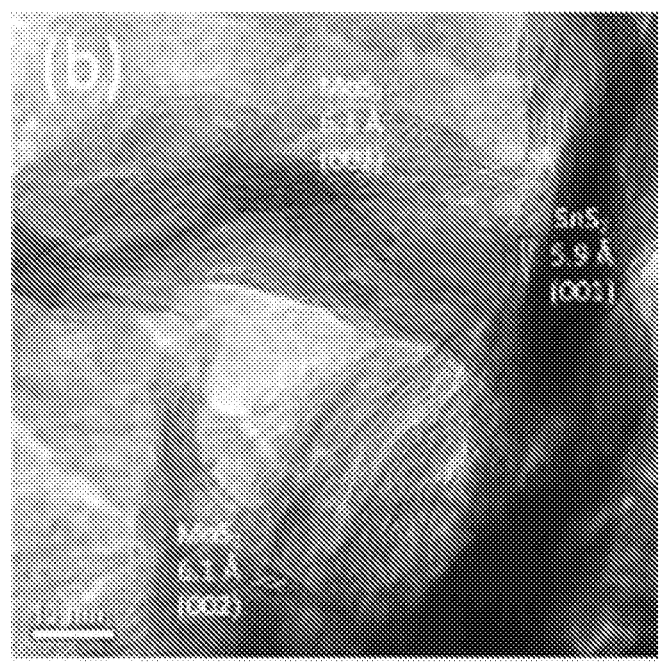
FIG. 29 shows an ex-situ HRTEM image of $SnS_2/MoS_2/3DG$ after 30 cycles and being charged to 3.0 V.

As shown in FIGS. 28 and 29, an ex-situ High Resolution Transmission Electron Microscopy (HRTEM) was carried out on SnS$_2$/MoS$_2$/3DG to provide additional supporting evidence to show the catalytic effect of MoS$_2$ to fully reduce Li$_2$S and release the "trapped" lithium as described by the typical irreversible/partially reversible reaction in equation (3).

This was carried out by disassembling coin cells that were either in a fully charged state (3.0 V) or in a fully discharged state (0.01V) after 20 charge-discharge cycles and washing the electrodes in NMP. As shown in FIG. 28, at fully discharged state the presence of Mo suggests the reversible conversion of MoS$_2$ whereas the absence of Sn implies an incomplete alloying of Sn with Li (equations 4 and 6). However, LixSn could not be identified in the HRTEM images possibly due to the non-crystalline phase of LixSn. In the fully charged state, lattices of MoS$_2$ and SnS$_2$ could be clearly identified.

Figure 27:
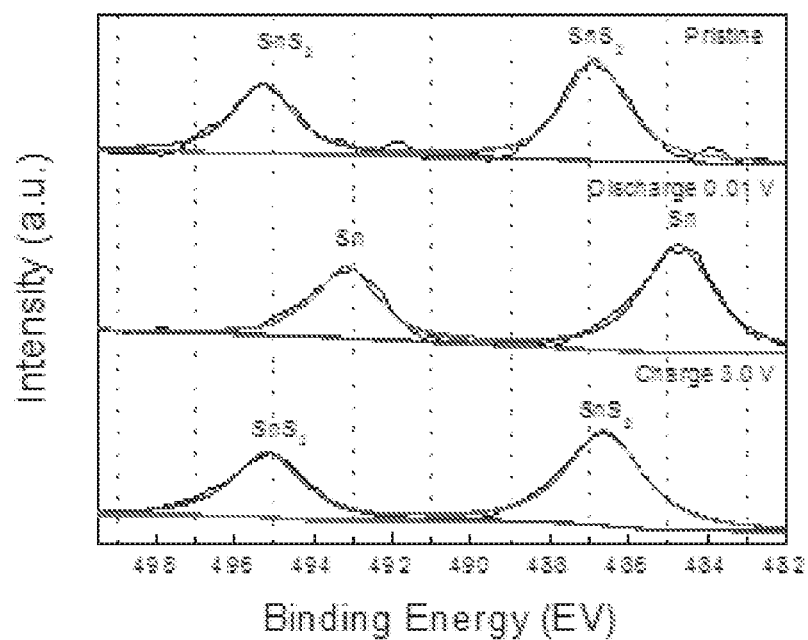
FIG. 27 shows Sn 3d spectra of the electrode in pristine, discharge, and charge state.

Additionally, ex-situ X-ray Photonspectroscopy (XPS) was carried out on the post cycled electrodes as shown in FIG. 27. FIG. 27 shows the high resolution XPS spectra of SnS$_2$/MoS$_2$/3DG at different states: initial, discharged, and charged. The peaks at the initial state corresponds to the Sn 3d5/2 and Sn 3d3/2 of Sn4+ in SnS$_2$. On discharge, these peaks shift towards 493.1 eV and 484.7 eV which corresponds to metallic tin (SnO) implying a reduction of Sn4+. On charge, these peaks return to the initial positions, which indicates that SnO oxidizes to Sn4+ (reformation of SnS$_2$). Hence, these post-cycled analyses of HRTEM and XPS provide substantial evidence of the reversible decomposition of Li$_2$S and conversion of Sn to SnS$_2$.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES

US Patent Documents:
(1) U.S. Pat. No. 7,060,390 B2 June 2006 Chen et al., "Lithium-Ion battery containing nano-materials", USPC 429/231.8.
(2) U.S. Pat. No. 9,120,677 A1 September 2015 Watson et al., "Bulk preparation of holey graphene via controlled catalytic oxidation", USPC 423/448.
(3) U.S. Pat. No. 8,920,970 B2 December 2014 Sunkara et al., "Anode materials for lithium-ion batteries", USPC 409/209.
(4) US 20130089796 Sun et al., "Lithium-air battery", USPC 429/406.

Research Literature:
(5) Seng, K. H., park, M. H., Guo, Z. P., Liu, H. K. and Cho, J. (2013) "Catalytic role of Ge in highly reversible GeO$_2$/Ge/C nanocomposite anode material for lithium batteries", Nano letters, 13(3), 1230-1236.
(6) Hwang, J., Jo, C., Kim, M. G., Chun, J., Lim, E., Kim, S., Jeong, Y., Kim and Lee, J. (2015). "Mesoporous Ge/GeO$_2$/Carbon lithium-ion battery anodes with high capacity and high reversibility", ACS nano, 9(5), 5299-5309, s.
(7) Zhu, Y. G., Wang, Y., Han, Z. J., Hsi, Y., Wong, J. I., Huang, Z. X., K. K., Ostrikov and Yang, H. Y. (2014), "Catalyst engineering for lithium ion batteries: the catalytic role of Ge in enhancing the electrochemical performance of SnO$_2$ (GeO$_2$) 0.13/G anodes", Nanoscale, 6(24), 15020-15028.
(8) Wang, Y., Huang, Z. X., Shi, Y., Wong, J. I., Ding, M., & Yang H. Y. (2015), "Designed hybrid nanostructure with catalytic effect: beyond the theoretical capacity of SnO$_2$ anode material for lithium-ion batteries, Scientific reports, 5.
(9) Zhang, M., et al., "Graphene oxide oxidizes stannous ions to synthesize tin sulfide-graphene nanocomposites with small crystal size for high performance lithium-ion batteries", Journal of Materials Chemistry, 2012, 22(43), p. 23091
(10) Qu, B., et al., "Origin of the Increased Li+-Storage Capacity of Stacked SnS$_2$/Graphene Nanocomposite", ChemElectroChem, 2015, 2(8), p. 1138-1143.
(11) Wang, Y., et al., "Pre-lithiation of onion-like carbon/MoS$_2$ nano-urchin anodes for high-performance rechargeable lithium-ion batteries", Nanoscale, 2014, 6(15), p. 8884-8890.
(12) Wang, Y., et al., "Designed hybrid nanostructure with catalytic effect: beyond the theoretical capacity of SnO$_2$ anode material for lithium-ion batteries", Sci. Rep., 2015, 5, p. 9164.
(13) Seng, K. H., Park, M. H., Guo, Z. P., Liu, H. K., & Cho, J. (2013). "Catalytic role of Ge in highly reversible GeO$_2$/Ge/C nanocomposite anode material for lithium batteries", Nano letters, 13(3), 1230-1236.
(14) Hwang, J., Jo, C., Kim, M. G., Chun, J., Lim, E., Kim, S., Jeong, Y., Kim & Lee, J. (2015), "Mesoporous Ge/GeO$_2$/Carbon Lithium-ion Battery Anodes with High Capacity and High Reversibility". ACS nano, 9(5), 5299-5309.
(15) Huang Z X, Wang Y, Zhu Y G, Shi Y, Wong J I, Yang H Y, "3D graphene supported MoO2 for high performance binder-free lithium ion battery", Nanoscale, 2014, 6(16), 9839-45.

The invention claimed is:

1. An electrode for use in a lithium-ion battery, the electrode comprising a group IV-VI compound and a transition metal group VI compound on a three-dimensional graphene network, wherein a major portion of the transition metal group VI compound is provided on top of the group IV-VI compound or in close proximity to it, whereby the transition metal group VI compound contributes to the decomposition of a lithium group VI compound at the surface of the group IV-VI compound, the group IV-VI compound being represented by a chemical formula MX2, wherein M is selected from tin, germanium and silicon and X is selected from sulphur, oxygen and selenium, the transition metal group VI compound comprising a transition metal and a group VI element, the group VI element being selected from sulphur, oxygen and selenium.

2. The electrode according to claim 1, wherein a content of the transition metal group VI compound is between 2 and 8 weight percent.

3. The electrode according to claim 1, wherein a molybdenum group VI compound is provided on a material which comprises the group IV-VI compound on a three-dimensional graphene network.

4. The electrode according to claim 1, wherein the transition metal group VI compound is provided in a form of nanosheets.

5. The electrode according to claim 4, wherein the nanosheets of the transition metal group VI compound are provided on larger nanosheets of the group IV-VI compound.

6. The electrode according to claim 1, wherein a loading of the group IV-VI compound is 0.7-1 mg per cubic centimeter of the three-dimensional graphene network.

7. The electrode according to claim 1, wherein the three-dimensional graphene forms a binder-free interconnected porous network.

8. The electrode according to claim 1, wherein the group IV-VI compound is tin disulfide and the transition metal group VI compound is molybdenum disulfide or tungsten disulfide.

9. A lithium-ion battery comprising an electrode according to claim 1, the lithium-ion battery further comprising a casing with a first terminal and a second terminal, a counter electrode and an electrolyte, the electrolyte containing lithium ions, wherein the electrode, the counter electrode and the electrolyte are provided in the casing, the electrode is connected to a first terminal, the counter electrode is connected to the second terminal, and the electrolyte is in contact with the electrode and with the counter electrode.

10. A method of producing an electrode for a lithium-ion battery, the method comprising:
  depositing a carbon compound on a porous metal scaffold by chemical vapor deposition to obtain a three-dimensional graphene;
  bringing a group IV compound into contact with the three-dimensional graphene, the group IV compound comprising tin, germanium or silicon;
  subjecting the group IV compound and the three-dimensional graphene to a hydrothermal treatment to obtain a group IV-VI compound surface structure on the three-dimensional graphene;
  bringing a transition metal group VI compound into contact with the three-dimensional graphene; and
  subjecting the transition metal group VI compound and the three-dimensional graphene with the group IV-VI compound surface structure to a hydrothermal treatment to obtain a transition metal group VI compound surface structure on the group IV-VI compound surface structure.

11. The method according to claim 10, wherein preparation of the three-dimensional graphene comprises:
  flowing a mixture of argon and ethanol over a nickel foam;
  cooling the reaction product; and
  etching away the nickel foam.

12. The method according to item 10, wherein preparation of the group IV-VI compound on the three-dimensional graphene comprises:
  providing a mixture of a group IV tetrachloride, water, thioacetamide and sodium dodecyl sulfate in ethanol, the group IV tetrachloride being selected from tin tetrachloride, germanium tetrachloride and silicon tetrachloride;
  bringing the mixture and the three-dimensional graphene together; and
  letting the mixture and the three-dimensional graphene react.

13. The method according to claim 10, wherein preparation of the transition metal group VI compound on the three-dimensional graphene comprises;
  providing a mixture of a group VI amino acid and sodium transition metal compound in water and ethanol, the group VI amino acid being selected from L-cysteine, selenocysteine and serine;
  bringing pieces of the three-dimensional graphene with the group IV-VI surface structure and the mixture together; and
  letting the three-dimensional graphene with the group IV VI compound surface structure and the mixture react.

14. The method according to claim 10 comprising drying the electrode material at a temperature above 100° C.

15. A method for producing a lithium-ion battery comprising:
  producing an electrode according to claim 10, the method further comprising:
  providing a counter electrode and a membrane;
  inserting the electrode, the membrane and the counter electrode into a casing of the coin cell;
  filling an electrolyte into the casing of the lithium-ion battery; and
  closing the casing of the lithium-ion battery.

* * * * *